(12) United States Patent
Walker et al.

(10) Patent No.: US 10,156,140 B2
(45) Date of Patent: Dec. 18, 2018

(54) METAL JOINING AND STRENGTHENING METHODS UTILIZING MICROSTRUCTURAL ENHANCEMENT

(75) Inventors: Bryant Walker, Palm City, FL (US); Raymond Walker, Port Saint Lucie, FL (US)

(73) Assignee: KEYSTONE SYNERGISTIC ENTERPRISES, INC., Port Saint Lucie, FL (US)

( * ) Notice: Subject to any disclaimer, the term of this patent is extended or adjusted under 35 U.S.C. 154(b) by 1319 days.

(21) Appl. No.: 14/000,164

(22) PCT Filed: Feb. 16, 2012

(86) PCT No.: PCT/US2012/025453
§ 371 (c)(1),
(2), (4) Date: Dec. 20, 2013

(87) PCT Pub. No.: WO2012/112779
PCT Pub. Date: Aug. 23, 2012

(65) Prior Publication Data
US 2014/0161618 A1   Jun. 12, 2014

Related U.S. Application Data

(60) Provisional application No. 61/443,683, filed on Feb. 16, 2011.

(51) Int. Cl.
*F01D 5/00* (2006.01)
*B23K 15/00* (2006.01)
(Continued)

(52) U.S. Cl.
CPC .......... *F01D 5/005* (2013.01); *B23K 15/0006* (2013.01); *B23K 15/0093* (2013.01);
(Continued)

(58) Field of Classification Search
CPC . B23K 15/0006; B23K 2201/001; F02K 9/52; Y10T 29/49318
(Continued)

(56) References Cited

U.S. PATENT DOCUMENTS 3,613,106 A   10/1971   Cavagnero
4,784,827 A   11/1988   Hiraga et al.
(Continued)

FOREIGN PATENT DOCUMENTS

JP   S5414347 A   2/1979

OTHER PUBLICATIONS

PCT Application PCT/US2012/025453 International Search Report and Written Opinion dated Aug. 17, 2012, 20 pages.
(Continued)

*Primary Examiner* — Jie Yang
(74) *Attorney, Agent, or Firm* — Lathrop Gage LLP

(57) ABSTRACT

A method for joining first and second metal portions includes welding together the portions such that a weld nugget joins them, compressively stressing the weld nugget throughout its volume, and heat treating the compressively stressed weld nugget to recrystallize metal therein. A method for strengthening a metal element includes imparting compressive stress within a region of the metal element, and heat treating it such that metal of the region recrystallizes with a finer grain structure than was present in the region before the step of imparting the compressive stress. A repaired metal part includes a first, original section made of metal alloy, and a second, repair section of metal alloy joined to the original section by a recrystallized metal weld having crystals within +/−3 ASTM-112 grain sizes of the size of the crystals of the original and repair sections.

22 Claims, 15 Drawing Sheets

(51) Int. Cl.
| | |
|---|---|
| *F02K 9/52* | (2006.01) |
| *F02K 9/58* | (2006.01) |
| *F02K 9/62* | (2006.01) |
| *B23K 26/20* | (2014.01) |
| *F01D 5/14* | (2006.01) |
| *B23K 26/00* | (2014.01) |
| *B23K 26/21* | (2014.01) |
| *B23K 101/00* | (2006.01) |

(52) U.S. Cl.
CPC .......... *B23K 26/0006* (2013.01); *B23K 26/20* (2013.01); *B23K 26/21* (2015.10); *F01D 5/147* (2013.01); *F02K 9/52* (2013.01); *F02K 9/58* (2013.01); *F02K 9/62* (2013.01); *B23K 2201/001* (2013.01); *F05D 2250/41* (2013.01); *Y10T 29/49318* (2015.01)

(58) Field of Classification Search
USPC ...................................................... 148/534
See application file for complete search history.

(56) References Cited

U.S. PATENT DOCUMENTS

| | | | |
|---|---|---|---|
| 5,022,581 A | 6/1991 | Zimmer | |
| 5,770,832 A | 6/1998 | Carnes et al. | |
| 5,855,699 A | 1/1999 | Oyama et al. | |
| 6,103,027 A | 8/2000 | Glasier, Jr. et al. | |
| 6,120,624 A | 9/2000 | Vogt et al. | |
| 6,333,484 B1 * | 12/2001 | Foster | B23K 20/002 219/121.64 |
| 6,568,077 B1 * | 5/2003 | Hellemann | B23K 9/044 228/19 |
| 6,899,773 B2 | 5/2005 | Buck | |
| 6,926,970 B2 | 8/2005 | James et al. | |
| 7,378,622 B2 | 5/2008 | Dydo et al. | |
| 7,825,348 B2 | 11/2010 | Bouet et al. | |
| 8,414,267 B2 * | 4/2013 | Ganesh | B21J 5/002 29/889.2 |
| 2005/0150871 A1 | 7/2005 | Offer | |
| 2006/0042729 A1 | 3/2006 | Kottilingam et al. | |
| 2006/0157165 A1 | 7/2006 | Kottilingam et al. | |
| 2007/0261458 A1 | 11/2007 | Oruganti et al. | |
| 2008/0000947 A1 * | 1/2008 | Derrien | B23K 15/0006 228/44.3 |
| 2009/0183804 A1 | 7/2009 | Zhao et al. | |
| 2010/0140230 A1 | 6/2010 | Schreiber et al. | |

OTHER PUBLICATIONS

PCT Application PCT/US2012/025453 Response to Written Opinion filed Dec. 17, 2012, 55 pages.
PCT Application PCT/US2012/025453 International Preliminary Report on Patentability dated Apr. 18, 2013, 53 pages.
Extended European Search Report dated May 30, 2017 for European Patent Application No. 12746451.9 (6 pages).

* cited by examiner

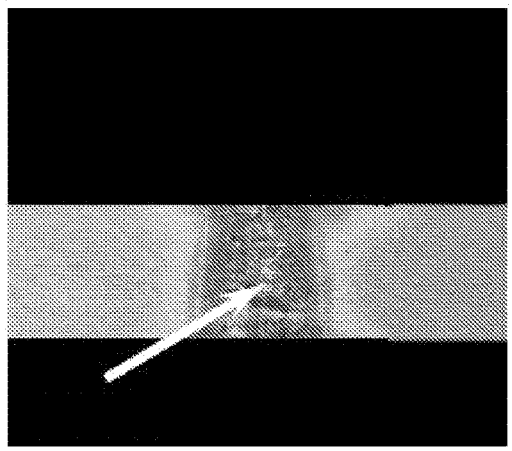
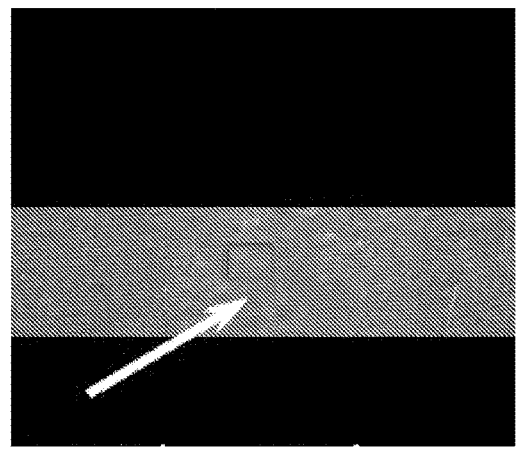
FIG. 11A  FIG. 11B
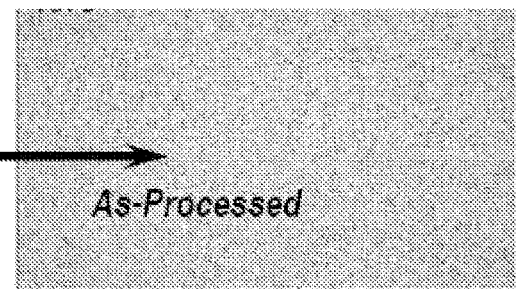
FIG. 11C  FIG. 11D
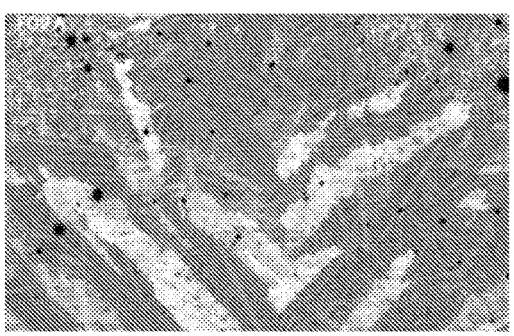
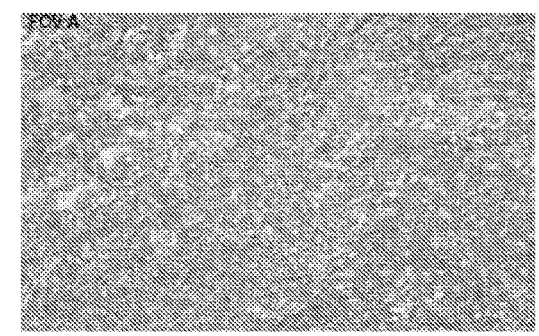
FIG. 11E  FIG. 11F

METAL JOINING AND STRENGTHENING METHODS UTILIZING MICROSTRUCTURAL ENHANCEMENT

CROSS-REFERENCE TO RELATED APPLICATIONS

This application claims priority to U.S. Provisional Patent Application Ser. No. 61/443,683, filed 16 Feb. 2011, which is incorporated by reference in its entirety.

U.S. GOVERNMENT RIGHTS

This invention was made with Government support under NAVAIR sponsored SBIR Topic N08-034, Contract Numbers N68335-06-C-0261 and N68335-10-C-0046 awarded by the United States Navy. The Government has certain rights in this invention.

BACKGROUND

High-speed engines, particularly those utilized in aircraft, may include rotating elements such as fans, turbines and/or rotors (collectively called "rotors" hereinafter) for compressing air.

FIG. 1A is a simplified, schematic cross section of a jet engine 100 that utilizes rotors 110. Airflow through engine 100 is illustrated by arrows 120. Rotors 110 suck air into an inlet end 102 of engine 100 and compress it into combustion chambers 130. Jet fuel burns with the air to form jet exhaust, which expands and is expelled at outlet end 104 of engine 100. The expanding jet exhaust spins turbines 140 that connect through an axle 150 to turn rotors 110. The assembly formed by rotors 110, turbines 140 and axle 150 may turn at thousands of revolutions per minute. Therefore, rotors 110 must be precisely balanced and of high mechanical integrity, because an unbalanced or broken rotor can fly apart, destroying the engine and possibly generating high speed shrapnel that can damage adjacent objects, such as wings or fuselage of an aircraft. These requirements present challenges for the manufacture and repair of rotors 110.

It is often costly to manufacture a rotor by mounting discrete blades on a common structure. The blades and common structure must be precisely formed and attached so that the final rotor is balanced. However, such structures are compatible with repair of individual nicked or broken blades (e.g., due to an engine aspirating foreign matter, such as a bird). In such cases, the blade that needs to be repaired can be removed and a new blade attached in the same manner as for the initial manufacture of the rotor.

Integrally bladed rotors have recently begun to appear in military aircraft; it is expected that commercial aircraft will also utilize such rotors. FIG. 1B shows one example of an integrally bladed rotor 110(1). Rotor 110(1) is formed of a high strength alloy, the metal of which is manufactured in a "parent-metal" metallurgical state, typically characterized by an equiaxed, fine grain structure. Although initial manufacture of integrally bladed rotors has become practical in recent years, repair of such rotors is problematic. One method of repair called "blending" simply grinds away and polishes damage sites. This improves reliability to a point, because without blending, the damage sites can form nucleation sites for cracks to propagate through the damaged blade. However, by removing material, the blending affects the balance of the rotor, therefore the original equipment manufacturers (OEMs) of engines place strict limits on the amount of blending that can be done. The same OEMs would allow removal and replacement of metal, but they specify that replaced metal must have the metallurgical properties of the parent metal. To date, welding a new blade in place (or adding a piece of a blade by welding) typically results in a metallurgical difference between the metal that melts and resolidifies due to the act of welding (called a "weld nugget" hereinafter) and the "parent" metal (e.g., adjacent unwelded metal). In such a case, the weld may be weaker than the original material, particularly in fatigue strength. Therefore, no welding technology to date has become qualified for repair of integrally bladed rotors.

Many attempts by industry to achieve parent metal fatigue properties in repaired IN-100 and other high strength superalloys have failed. Such attempts have included layer-by-layer laser sintering buildup, and plasma powder deposition approaches. Both of these approaches have failed to produce parent metal fatigue properties. This is at present believed to be due to (a) porosity of the metal thus formed, due to inert gas trapped during powder processing, (b) presence of oxides, carbides or ceramic inclusions, and (c) inability to match the weld zone microstructure to that of the parent metal.

Therefore, at present there is no satisfactory repair method for integrally bladed rotors damaged beyond OEM blending limits. When even a few blades of such rotors become damaged, the entire rotor is typically replaced—at a current cost of about $125K for a Ni superalloy rotor, or about $250K for a Ti rotor. Rotors that are unrepairable according to these standards are presently accumulating at engine overhaul shops awaiting development of an acceptable repair technology. The inventory of presently unrepairable rotors continues to increase as the number of engines that utilizes them increases, and the number of flight hours on the engines increases.

Not only can weld repair sites be problematically weak, but it is known that nickel alloys become difficult to weld at all when hardening agents such as aluminum and titanium exceed an aggregate amount of about 4.5%. FIG. 2 shows a graph 200 that illustrates composition of certain nickel alloys known by the trade names Inconel 702, IN-718, Mar-M-200, Waspaloy, Astroloy, IN-100 and Modified Waspaloy. Percent titanium is shown on the horizontal axis and percent aluminum is shown on the vertical axis; a line 205 indicates the 4.5% boundary between alloys typically considered weldable (below/left of line 205) and alloys typically considered unweldable (above/right of line 205). The direction of arrow 210 indicates decreasing weldability. Some of the alloys considered unweldable (e.g., IN-100) are known as "superalloys" that have excellent properties such as high fatigue strength supporting their use in rotors 110. These same alloys are susceptible to hot cracking when welding is attempted using present methods.

It is also known to provide stress to metal surfaces by utilizing techniques such as shot peening, low plasticity burnishing and laser shock peening. These techniques impart residual compressive stress to a metal surface and thereby enhance resistance to fatigue damage. However, the stresses imparted by these techniques may be limited in depth, such that uniform stress may not exist throughout the metal volume of a treated article.

SUMMARY

The following embodiments and aspects thereof are described and illustrated in conjunction with systems, tools and methods that are meant to be exemplary and illustrative, not limiting in scope. In certain embodiments, one or more issues and/or limitations associated with the above-described systems and methods have been addressed, while other embodiments are directed to other improvements.

In an embodiment, a method for joining first and second metal portions includes welding together the first and second portions such that a weld nugget joins the first and second metal portions, compressively stressing the weld nugget throughout its volume, and heat treating the compressively stressed weld nugget to recrystallize metal therein.

In an embodiment, a method for strengthening a metal element includes imparting compressive stress within a region of the metal element, and heat treating the metal element, such that metal of the region recrystallizes with a finer grain structure than was present in the region before the step of imparting the compressive stress.

In an embodiment, a rotor for use in an aircraft engine is repaired by welding together the damaged blade of the rotor and a portion of metal to form a weld nugget, compressively stressing the weld nugget throughout its volume, and heat treating the compressively stressed weld nugget to recrystallize metal therein.

In an embodiment, a welding jig includes a spring loaded fixture for positioning first and second metal portions for welding, wherein a spring applies constant force between the first and second metal portions while allowing one or both of the first and second metal portions to expand thermally during the welding.

In an embodiment, a repaired metal part includes a first, original section made of metal alloy, and a second, repair section of metal alloy joined to the original section by a recrystallized metal weld having crystals within +/−3 ASTM-112 grain sizes of the size of the crystals of the original and repair sections.

In an embodiment, a repair kit for a damaged metal part includes (a) a repair section of metal, having a repair edge shaped to abut an edge of the damaged metal part, and a flange that overlaps the damaged metal part along the repair edge; and (b) two metal tabs, each metal tab being shaped to fit between the damaged metal part and the repair section, and having a thickness that matches thickness of the damaged metal part at a respective end of the repair edge.

In an embodiment, a method for repairing a metal part includes utilizing additive manufacturing to build new metal onto the metal part such that at least one dimension of the new metal exceeds a desired final dimension of the metal part, and compressively stressing the new metal throughout its volume. The method also includes heat treating the compressively stressed new metal to recrystallize metal therein, and machining the new metal to the desired final dimension.

BRIEF DESCRIPTION OF THE DRAWINGS

Exemplary embodiments are illustrated in the drawings. It is intended that the embodiments and drawings disclosed herein are illustrative rather than limiting. It is noted that, for purposes of illustrative clarity, certain elements in the drawings may not be drawn to scale. Specific instances of an item may be referred to by use of a numeral in parentheses (e.g., rotor 110(1)) while numerals without parentheses refer to any such item (e.g., rotors 110).

FIG. 11A shows a low magnification view of a weld between Ti parts, in an embodiment.

FIG. 11B shows the same view of the weld shown in FIG. 11A, after forging and heat treatment, in an embodiment.

FIG. 11C is a 100× photo micrograph of a field of view of FIG. 11A

FIG. 11D is a 100× photo micrograph of a field of view of FIG. 11B, in an embodiment.

FIG. 11E is a 50× photo micrograph of a welded region between IN-100 parts in an as-welded condition, in an embodiment.

FIG. 11F is a 50× photo micrograph of a welded region between IN-100 parts that has been forged and heat treated, in an embodiment.

DETAILED DESCRIPTION OF THE DRAWINGS

Figure 1A:
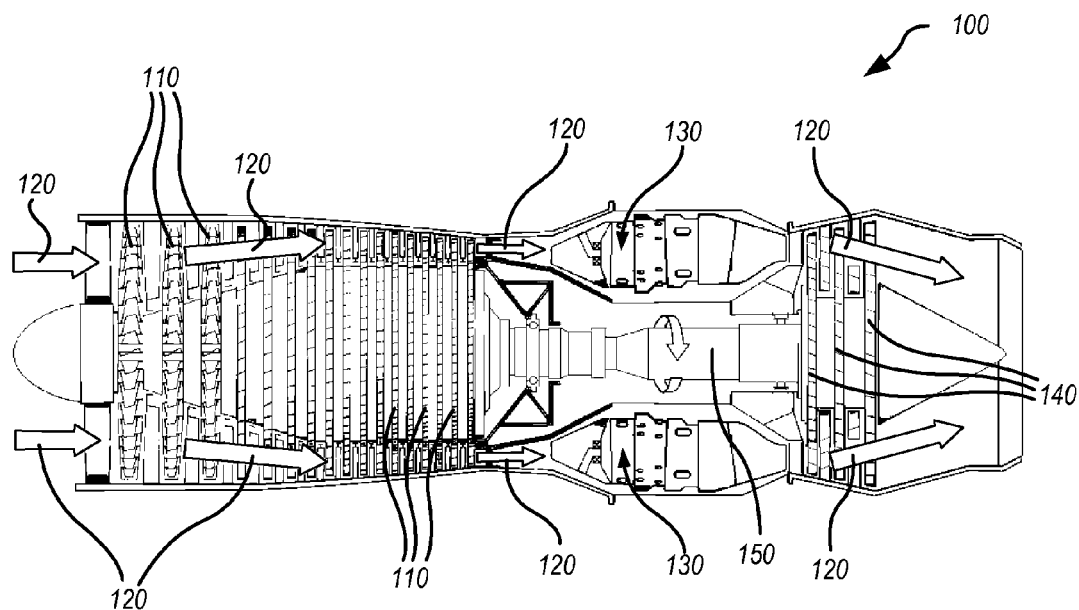
FIG. 1A is a simplified, schematic cross section of a jet engine that utilizes rotors.
Figure 1B:
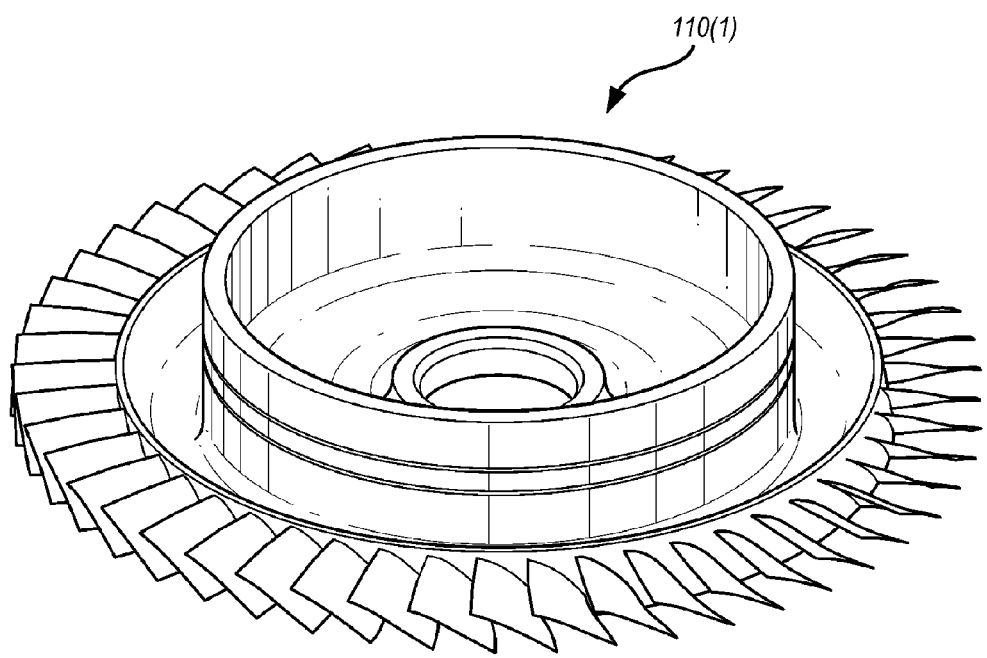
FIG. 1B shows one example of an integrally bladed rotor.
Figure 2:
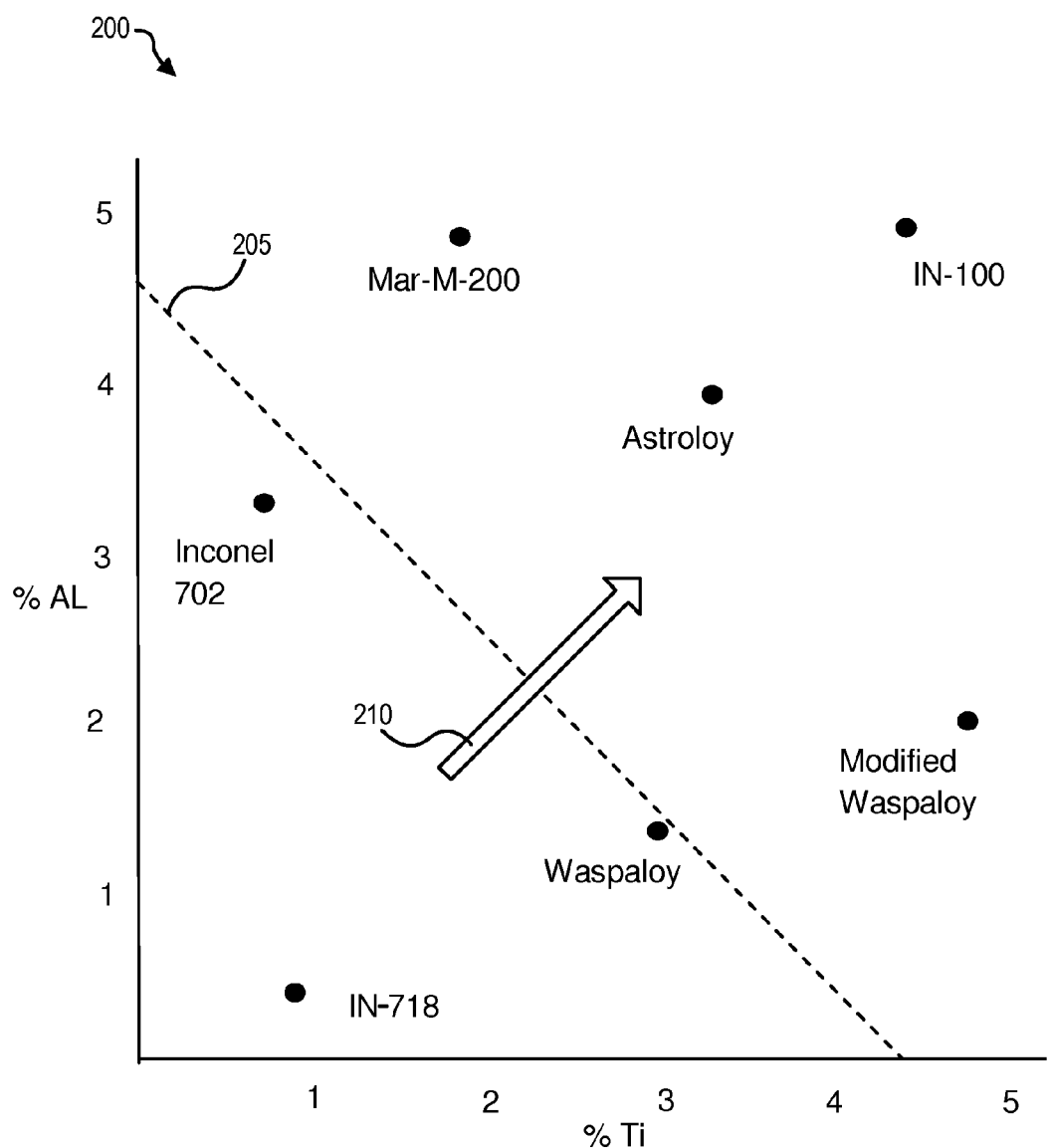
FIG. 2 shows a graph that illustrates composition of certain nickel alloys.

Various modifications to the described embodiments will be readily apparent to those skilled in the art and the principles herein may be applied to other embodiments. Thus, the present disclosure is not intended to be limited to the embodiments shown, but is to be accorded the widest scope consistent with the principles and features described herein. By way of introduction and not limitation, embodiments of these techniques include (1) methods of welding Ni superalloys; (2) methods of forging and heat treating Ni and Ti welds to convert welded material to parent metal morphology; (3) methods of forging and optionally heat treating Ni and Ti metal to improve fatigue strength; and (4) use of additive processing after welding to create positive metal for compression and/or machining to final tolerances.

Ni Superalloy Welding

As discussed above, Ni superalloys with large amounts of Ti and/or Al (over about 4.5%) are very sensitive to susceptible to hot cracking during welding. Two novel techniques address this susceptibility. In embodiments, a preconditioning procedure places much of the gamma prime phase into solution (especially secondary gamma prime— see FIGS. 3 and 4, below) by raising temperature of the metal to just below the gamma prime solvus temperature. Keeping the temperature below the gamma prime solvus temperature avoids complete solutioning of the alloying elements and helps avoid grain growth. The gamma prime is kept in solution by ramping the temperature down very slowly until the material is stable, generating a very fine grain structure. Then, a preheating step before welding raises temperature of the metal to another elevated temperature, this time somewhat below the gamma prime solvus temperature, to increase ductility of the metal for the welding step itself.

Combined, these two thermal treatments precondition the alloy to redistribute stresses associated with welding at a crystallographic level. That is, the combination of fine grain and high temperatures allows the grains and grain boundaries to displace easily, enabling the alloy to accommodate thermal stresses induced during welding, thus avoiding hot cracking. It also preconditions the welded part to withstand strains resulting from phase transformation and precipitation during subsequent heat treatments (as discussed further below) and thermal stresses during the service lifetime of the part, avoiding strain age cracking.

The preconditioning and preheating steps for welding Ni superalloys can be accomplished by utilizing any equipment capable of raising the parts to be welded to the appropriate temperature. However, it may be advantageous to perform the preconditioning immediately before the preheating, so that the same equipment, temperature measurement apparatus, and setup can be utilized for the preconditioning and the preheating. This minimizes setup time and minimizes the chance of the temperature of the preheating step reaching or exceeding the temperature of the preconditioning step. Two particularly advantageous modes of preconditioning and preheating the parts to be welded are electron beam heating and laser beam heating, both of which provide good temperature control and ability to localize the applied heat, and can be used for the welding itself. Localizing applied heat advantageously helps control an amount of material that may later be forged as part of a process for improving fatigue strength of the metal, as discussed further below.

A general heat treatment schedule for preconditioning Ni superalloys for welding is shown in Table 1. The exact temperatures utilized will depend on the gamma prime solvus temperature of the specific Ni superalloy being welded. Step 1-1 heats the metal to a temperature that is just below (e.g., within 50 degrees F. of) the gamma prime solvus temperature of the Ni superalloy. This temperature is maintained throughout step 1-2 for about one hour, to drive much of the gamma prime phase into solution. Step 1-3 ramps down the temperature very slowly, by 8 degrees Fahrenheit per minute or less (and optionally by 2 to 3 degrees Fahrenheit per minute) to avoid driving the solutioned gamma prime out of solution. Once the temperature drops to about 1000 F, the material is crystallographically stable such that the temperature can ramp down (in air) without further control, or a preheat step for welding can begin.

TABLE 1

General Heat Treatment Schedule for Ni superalloy weld preconditioning

| Step | Temperature setting | Ramp rate | Notes |
|---|---|---|---|
| 1-1 | Just below gamma prime solvus temp | Not critical | Heat from room temp to a temperature sufficient to allow gamma prime to move into solution. |
| 1-2 | Max of step 1 | Hold temp | Hold for about one hour at maximum temp of step 1. The goal is to maximize gamma prime in solution. |
| 1-3 | Ramp down | Less than −8 F./min, better if −2 F./ to −3 F./min | Very slow ramp down to stable temperature avoids stressing material, which would drive gamma prime out of solution at high temperature where material is still unstable |
| 1-4 | <=1000 F. | N/A | Below about 1000 F. material is stable, can ramp down to room temperature quickly for storage, or begin preheat for welding |

Figure 3:
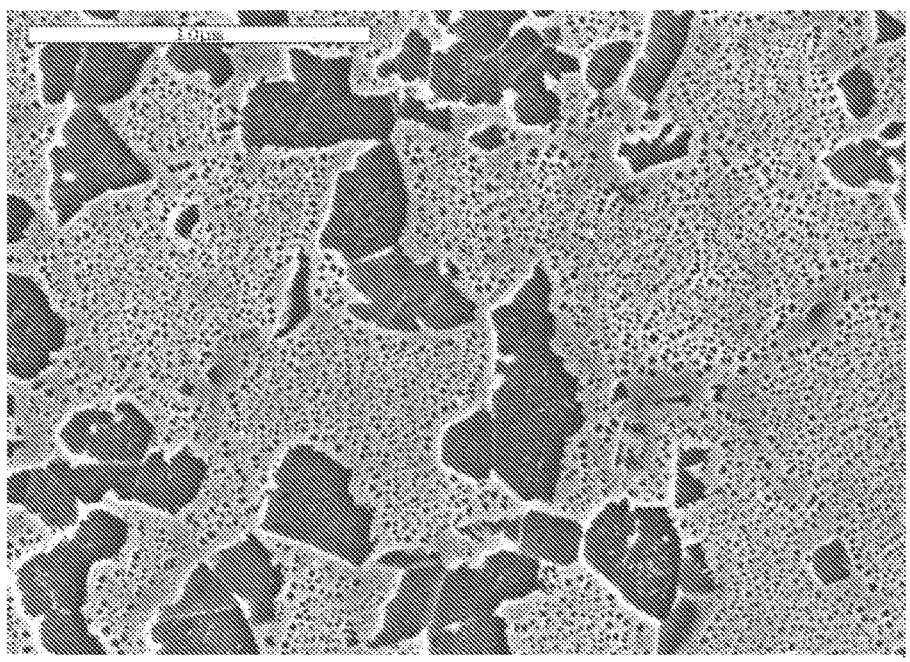
FIG. 3 shows a photo micrograph of a sample of IN-100 that was not preconditioned for welding.
Figure 4:
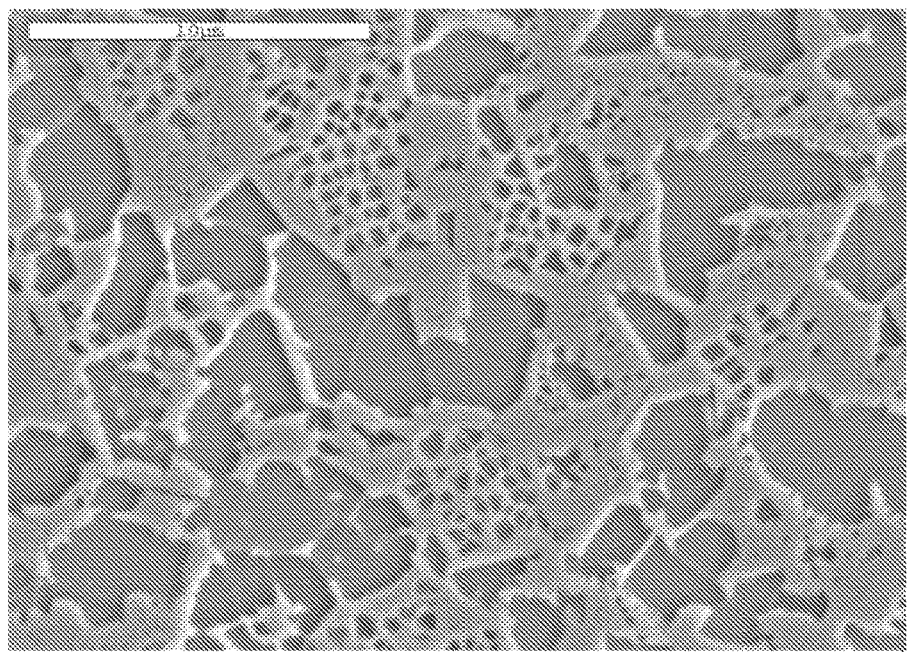
FIG. 4 shows a photo micrograph of a sample of IN-100 that was preconditioned for welding, in an embodiment.

In one test, matching samples of IN-100, with and without the preconditioning cycle listed in Table 1 were mounted, polished and metallographically evaluated. FIG. 3 shows a photo micrograph of the sample that was not preconditioned, and FIG. 4 shows a photo micrograph of the sample that was preconditioned, both showing the IN-100 material at a magnification of 5000×. There is a significant difference between FIGS. 3 and 4. FIG. 3 shows significant amounts of secondary gamma prime material (e.g., the tiny, dark islands). In FIG. 4, the secondary gamma prime appears to have gone completely into solution, the percentage of primary gamma prime (e.g., large islands) has been reduced (placed in solution), and the remaining primary gamma prime is uniformly dispersed with a more open, Lacey, overaged morphology. These microstructural results indicate that the pretreatment cycle listed in Table 1 will place IN-100 in an overaged condition and thus, reduce the sensitivity of the material to strain-age cracking in the heat-affected zone during electron beam welding and subsequent processing.

A general heat treatment schedule for preheating and welding Ni superalloys is shown in Table 2. As in Table 1, exact temperatures utilized will depend on the gamma prime solvus temperature of the specific Ni alloy being welded. Step 2-1 is a preheat step whose goal is to increase ductility of the metal during and after welding. The maximum preheat temperature is advantageously localized and applied only long enough to heat the parts to be welded uniformly at the area of the weld; this helps control an amount of material that may later be forged as part of a process for improving fatigue strength of the metal, as discussed further below. The preheat temperature should be maintained as closely as practical during step 2-2, the welding step; in practice there may be a delay of about 2 seconds but no longer than 10 seconds between preheating and welding. Step 2-3 ramps down the temperature by 100 degrees Fahrenheit or less to avoid introducing stress during cooling. Once the temperature drops to about 1200 F, the temperature can ramp down (in air) without further control.

TABLE 2

General Welding Heat Treatment Schedule for Ni superalloys

| Step | Temperature setting/operation | Ramp rate | Notes |
|---|---|---|---|
| 2-1 | About 50 F. below gamma prime solvus temp | Not critical | Preheat temperature should be above hot cracking temperature of the alloy (but below the preconditioning temperature). Maximum preheat temperature should be held only long enough to uniformly heat the joint to be welded. |
| 2-2 | Welding | Hold temp | Hold at preheat temperature during welding. |
| 2-3 | Ramp down | About −100 F./min or less | Slow ramp down to stable temperature avoids stressing material. |
| 2-4 | <=1200 F. | N/A | Below about 1200 F. material is stable enough to ramp down more quickly to room temperature. |

A specific heat treatment schedule for welding IN-100 is shown in Table 3.

TABLE 3

Welding Heat Treatment Schedule for IN-100

| Step | Temperature setting/operation | Ramp rate | Notes |
|---|---|---|---|
| 3-1 | Ramp up to 1950-2050 F. | Not critical, about 3 min total | May be applied utilizing a defocused electron beam. Maximum preheat temperature should be held only long enough to uniformly heat the joint to be welded. |
| 3-2 | Welding | Hold temp, weld may take 2-3 seconds | Hold at preheat temperature during welding; if defocused electron beam was utilized for preheating, the electron beam may be focused to make the weld. |
| 3-3 | Ramp down | About −100 F./min or less, about 8-10 min total | If electron beam is used, it may again be defocused. Slow ramp down to stable temperature avoids stressing material. |
| 3-4 | <=1000 F. | N/A | Below about 1000 F. material is stable enough to ramp down more quickly to room temperature. |

The act of welding can present risks during repair of an otherwise finished mechanical part, including risk of mechanical damage and risk of thermal processing that disturbs previous metallurgical state of the part. These risks can be mitigated by placing shielding around the item being welded, such as aluminum shrouds to block radiative heat transfer and/or bits of molten metal.

Another useful technique is to provide a compressive force during the welding itself, so that the parts being welded remain in intimate contact. However, thermal expansion during pretreatment and/or welding can cause sufficient thermal expansion that the parts being welded can pop out of a welding jig that attempts to hold the parts rigidly in place. Therefore, for example, a welding jig may be spring loaded such that the parts being welded have a known force holding them in place, but the spring(s) yield to thermal expansion such that the parts remain in place and in intimate contact during the welding. For example, the welding jig may apply 50-100 pounds of force to a blade repair weld that is about 2½ to 3 inches long, so that the parts are held within a tolerance of 0.001 inches relative to one another, yet the jig may allow for 0.015 inches of thermal expansion during preheating and welding.

Forging and Heat Treating Welds for Conversion to Parent Metal Morphology

Embodiments of welding and processing welds in Ni and Ti alloys, to provide welded parts wherein the welded metal achieves metallurgical properties that meet or exceed those of parent metal, are now discussed. In embodiments, a key principle is that welded material is forged and heat treated uniformly (that is, throughout a volume of the weld nugget and an adjacent heat affected zone) so that it recrystallizes with near parent metal morphology throughout, not just at the surface. The terms "recrystallize" and "recrystallization" herein mean that the affected metal forms smaller crystals; that is, these terms do not refer to crystalline changes that result in coarser crystals (such as occurs during welding, for example, in a heat affected zone adjacent to a weld). By doing so, a weld nugget between welded metal parts originally designated A and B essentially disappears in a macroscopic sense, in the sense that the resulting welded part has substantially parent metal morphology from (and including) metal part A, through and including the site of the weld, to (and including) metal part B. Some microstructural differences may exist, but would only be evident under high magnification and the recrystallized metal will be very different from the as-welded condition. Examples of repair of integrally bladed rotor blades are utilized to illustrate these principles, but do not limit the applicability of the present disclosure to such blades.

Figure 5A:
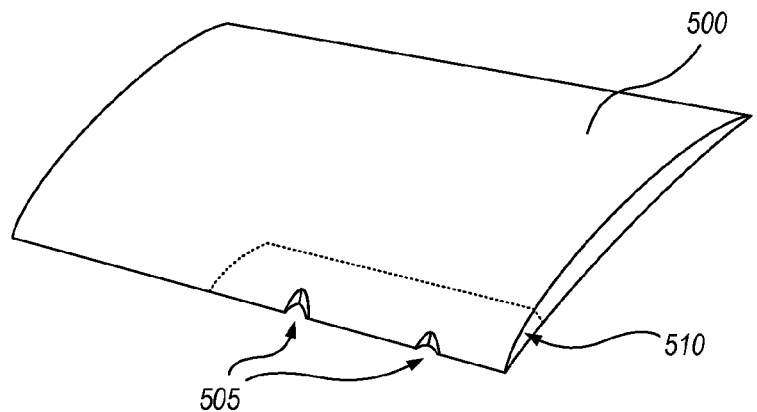
FIG. 5A schematically shows a damaged rotor blade that has damage sites, in an embodiment.
Figure 5B:
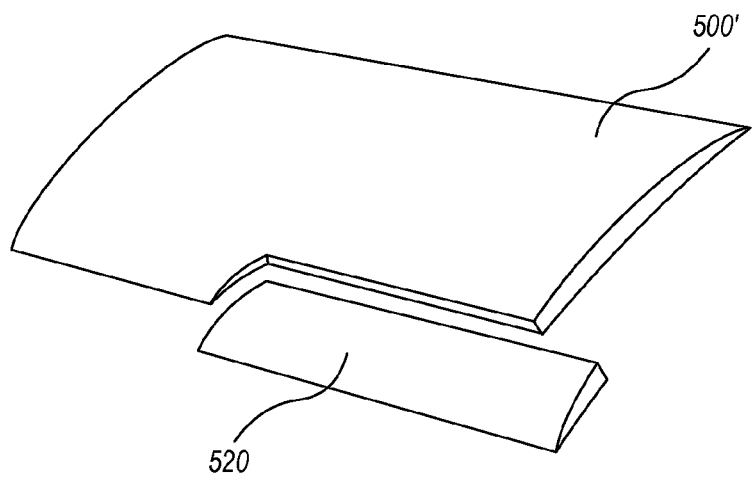
FIG. 5B schematically shows a rotor blade that represents the blade of FIG. 5A after a damaged section is removed, in an embodiment.
Figure 5C:
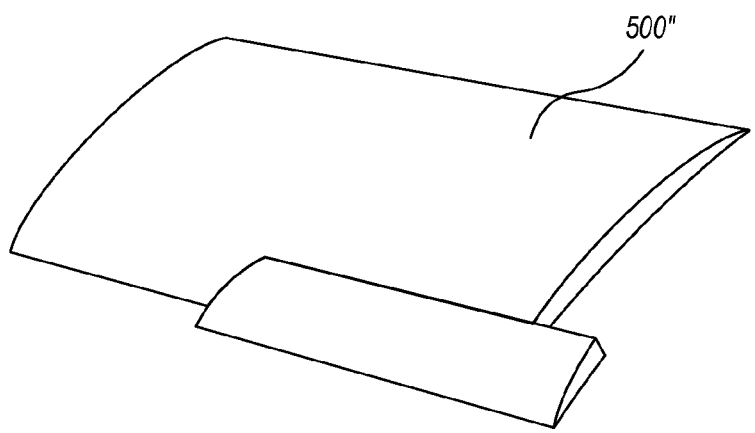
FIG. 5C shows a rotor blade that represents blade of FIG. 5B with a repair patch welded into the former location of the damaged section, in an embodiment.

In embodiments, welding and processing welds in Ni and Ti alloys is facilitated by providing a predictable, clean and tight fit between the parts to be welded. When damage occurs, it may be advantageous to cut out a damaged section so that the cut edge can provide a known and uniform boundary for the weld. FIG. 5A schematically shows a damaged rotor blade 500 that has damage sites 505. A section 510 includes damage sites 505. FIG. 5B schematically shows a rotor blade 500' that represents blade 500 after section 510 is removed (e.g., by cutting) and shows a repair patch 520 shaped for welding to blade 500'. Repair patch 520 is oversized in length, width and thickness, as compared to section 510. FIG. 5C shows a rotor blade 500" that represents blade 500' with repair patch 520 welded into the former location of section 510. When blades 500, 500', 500" are of Ni superalloy, repair patch 520 may be welded utilizing the pretreatment and welding heat treatment schedules described above in Tables 1 and 2. Welding may be done by known methods; electron beam and/or laser welding may advantageously localize the heat affected zone associated with the weld, and provide precise control over the temperatures reached in such heat affected zone and at the weld itself. A spring-loaded jig may be utilized during welding to keep blade 500' and repair patch 520 in intimate contact during pretreatment and/or welding, without popping out of place due to thermal expansion.

Figure 6:
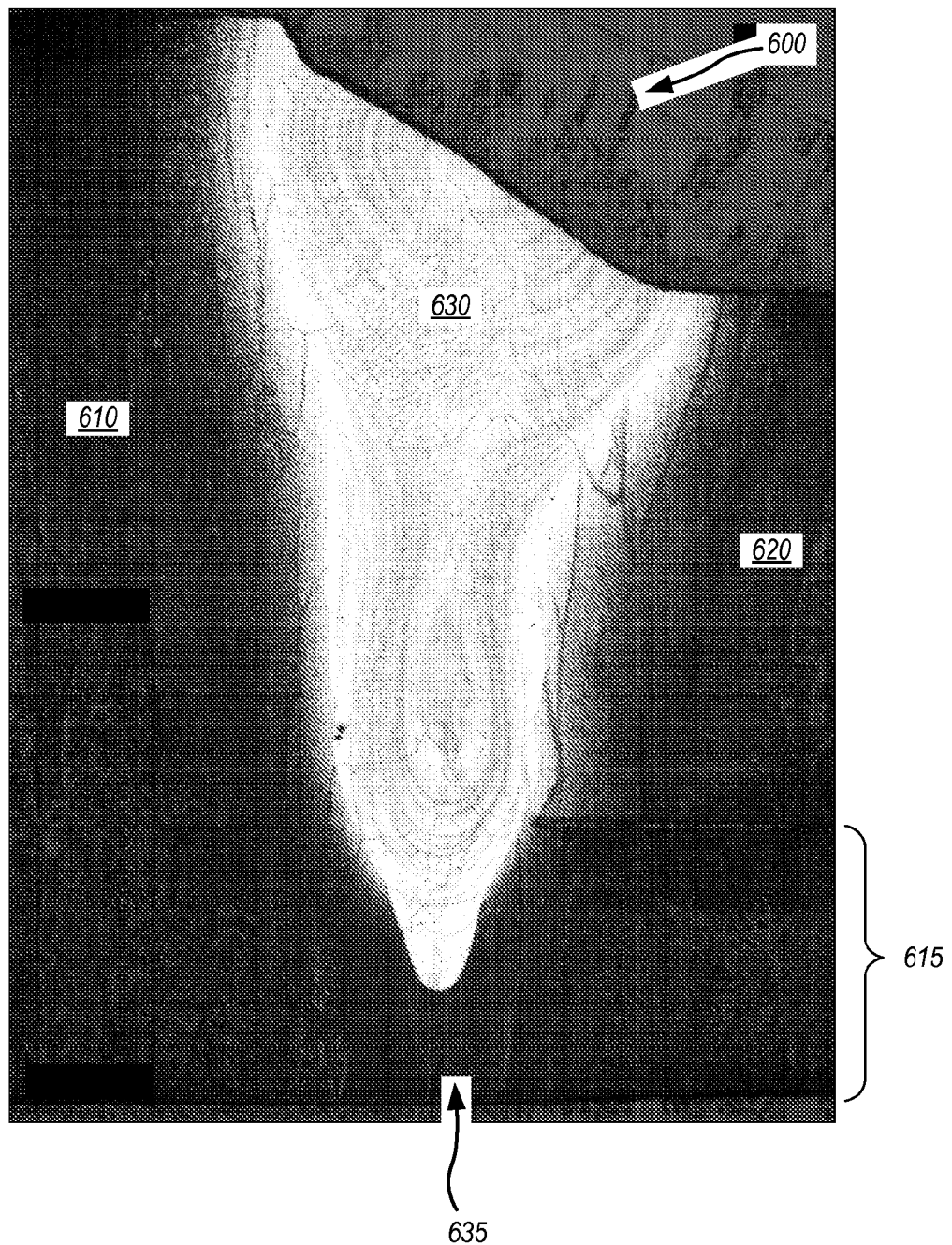
FIG. 6 is a cross-sectional photograph of welded metal parts with a weld nugget therebetween, in an embodiment.

As described above, welding will generate a weld nugget between blade 500' and repair 520. FIG. 6 is a cross-sectional photograph of a composite welded metal part 600 formed of metal parts 610 and 620 with a weld nugget 630 therebetween (the much lighter area between the dark metal areas). The metal of weld nugget 630 typically has a much coarser grain structure than the rest of the metal in parts 610 and 620. Left untreated, composite metal part 600 may have low fatigue strength at boundaries between weld nugget 630 and parts 610 and 620. Converting the grain structure of weld nugget 630 to fine grained metal is key to improving the fatigue strength of composite metal part 600. Portions of the structure labeled in FIG. 6 are described further below.

Figure 7A:
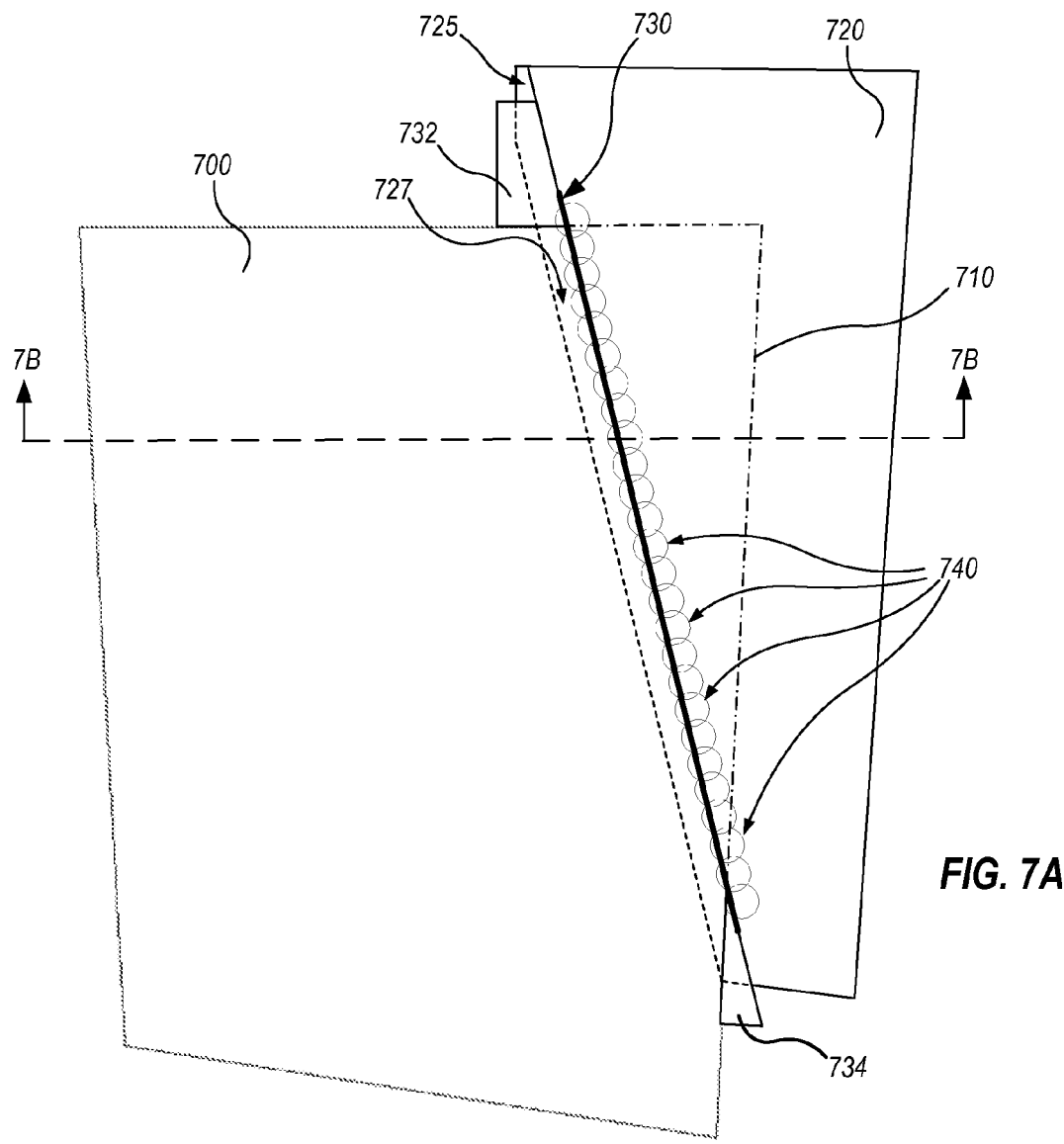
FIG. 7A is a schematic diagram that illustrates materials and operations associated with repair of a rotor blade, in an embodiment.

In embodiments, a weld nugget (and, optionally, an adjacent heat affected zone) are forged and heat treated to convert their grain structure. FIG. 7A is a schematic diagram that illustrates materials and operations associated with repair of a rotor blade 700. A damaged portion 710 (shown in ghost outline) is first removed by cutting to form a flat edge. A repair patch 720 is brought into contact with blade 700 along a weld line 730; a flange 725 of repair patch 720 overlaps blade 700 in an overlap region 727, as shown. Flange 725 advantageously forms a "beam stop" for electron beam or laser welding such that sufficient power can be applied by the electron or laser beam to weld throughout a thickness of blade 700, yet flange 725 stops the electron beam or laser from blowing metal out of a side of the weld that is farthest from the source of the beam or laser. A line 7B-7B' indicates a location of a cross-sectional view shown in FIG. 7B.

Figure 7B:
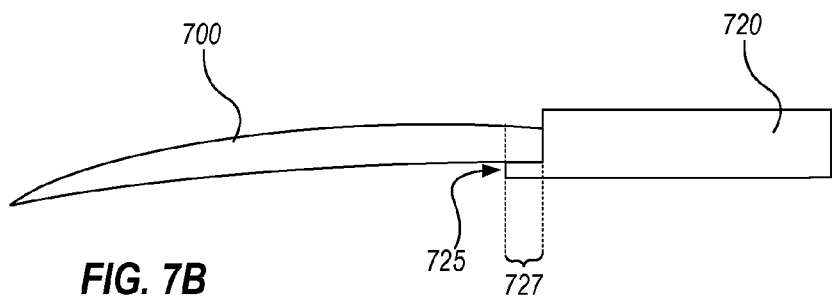
FIG. 7B is a cross-sectional, schematic diagram of the rotor blade of FIG. 7A, and a repair patch, in an embodiment.

FIG. 7B is a cross-sectional, schematic diagram taken at line 7B-7B' in FIG. 7A. As shown, blade 700 forms a flat edge that abuts a corresponding edge of patch 720. Patch 720 is thicker than blade 700 so that it can later be machined to a final shape that matches the original shape of blade 700. In overlap region 727, blade 700 overlaps flange 725. When an electron beam or laser beam weld blade 700 to patch 720, flange 725 acts as a beam stop.

Comparing the features shown in FIG. 6 with those shown in FIGS. 7A and 7B, it can be seen that metal part 610 corresponds to patch 720, and a flange 615 of metal part 610 corresponds to flange 725. Metal part 620 corresponds to blade 700. Also, in FIG. 6 it is evident that weld nugget 630 extends throughout a region where parts 610 and 620 abut one another (e.g., the full thickness of part 620), and that a deepest point 635 of weld nugget 630 extends partially into, but not through, flange 615. Therefore, during electron beam welding, flange 615 acted as a beam stop, as discussed with reference to flange 725, FIG. 7.

Returning to FIG. 7A, tabs 732, 734 may be placed as shown at ends of weld line 730 as shown. Tabs 732, 734 will not form part of the finished repair, but are utilized to provide uniform continuation of the structure of blade 700 in the direction of weld line 730, for consistency of the welded metal (e.g., to avoid edge effects of welding or forging at the edge of blade 700). That is, tabs 732, 734 will be welded together with blade 700 and patch 720, but machined away later. When blade 700 is formed of a Ni superalloy, the welding step may utilize the pretreatment and welding heat treatment schedules described above.

Also shown in FIG. 7A is a set of indentations 740 along weld line 730. Not all of indentations 740 are labeled within FIG. 7A, for clarity of illustration. Indentations 740 are applied after welding, and serve to disrupt the coarse grain crystal structure of the weld nugget. Indentations 740 are typically applied simultaneously to a front and a rear surface of a welded repair by squeezing the repaired part within an indenting tool. Indentations 740 typically overlap to provide uniform strain within the weld nugget along weld line 730 and, optionally, within an adjacent heat affected zone, as now discussed. The exact positions of indentations 740 shown in FIG. 7A relative to one another and relative to weld line 730 are illustrative only; indentations 740 may be arranged in other ways so as to overlap more or less than shown, or in multiple rows as compared to the single row shown.

Figure 8:
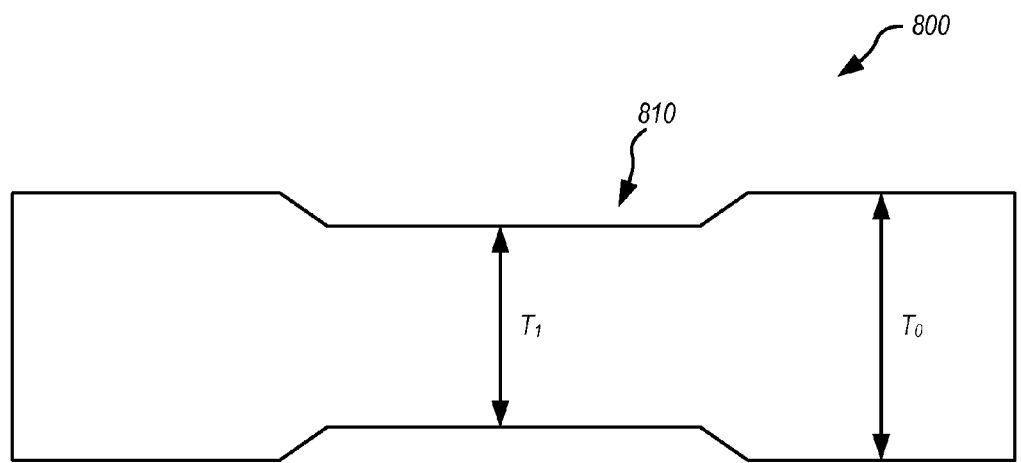
FIG. 8 schematically shows a piece of metal having an original thickness $T_0$, and an indented region that has a reduced thickness $T_1$, in an embodiment.

Each indentation 740 typically produces a column of disrupted crystal structure between indentations made by the indenting tool on opposite sides of a weldment at the weld line (e.g., in the weld nugget) and/or within the adjacent heat affected zone. (See also FIGS. 13 and 14, for an illustration of how spatial extent and symmetry of upset may be controlled.) Effect of the disruption is related to the percentage of thickness reduction at each indentation. FIG. 8 schematically shows a piece of metal 800 having an original thickness $T_0$, and an indented region 810 that has a reduced thickness $T_1$. An amount of "upset" in indented region 810 can be defined as a percentage reduction in thickness from $T_0$ to $T_1$, that is, $$\text{Upset} = (T_0 - T_1) \ast 100 / T_0 \qquad \text{Eq. 1}$$

In embodiments, upset in the range of 20% to 30% typically results in enough disruption to the crystalline structure of a weld nugget and/or surrounding heat affected zone that subsequent heat treatments, described below, can recrystallize the indented metal, causing it to revert to parent metal crystalline structure and fatigue properties.

Figure 9:
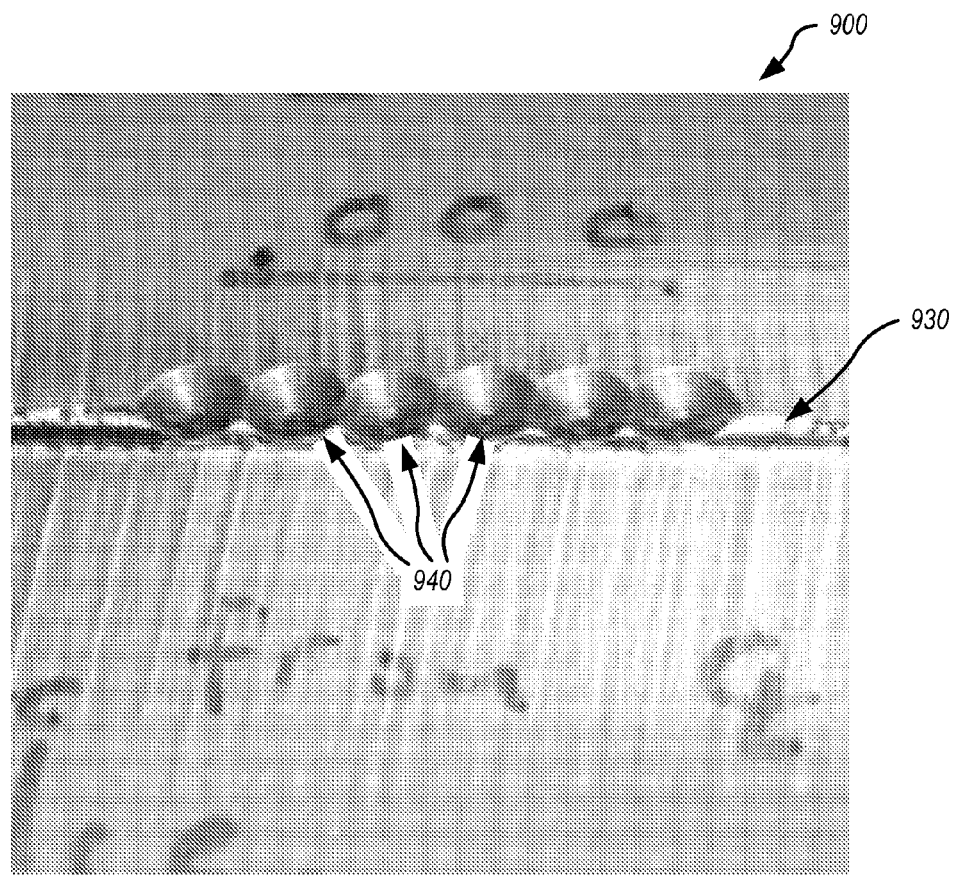
FIG. 9 shows exemplary indentations on a portion of a welded part, in an embodiment.
Figure 10A:
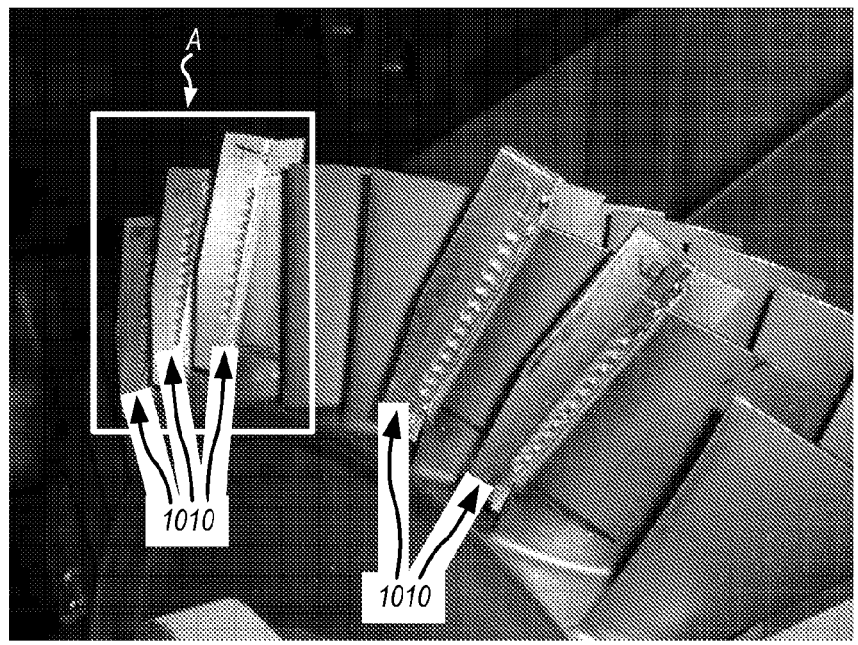
FIG. 10A shows welded and forged patches on an integrally bladed rotor 1000, in an embodiment.
Figure 10B:
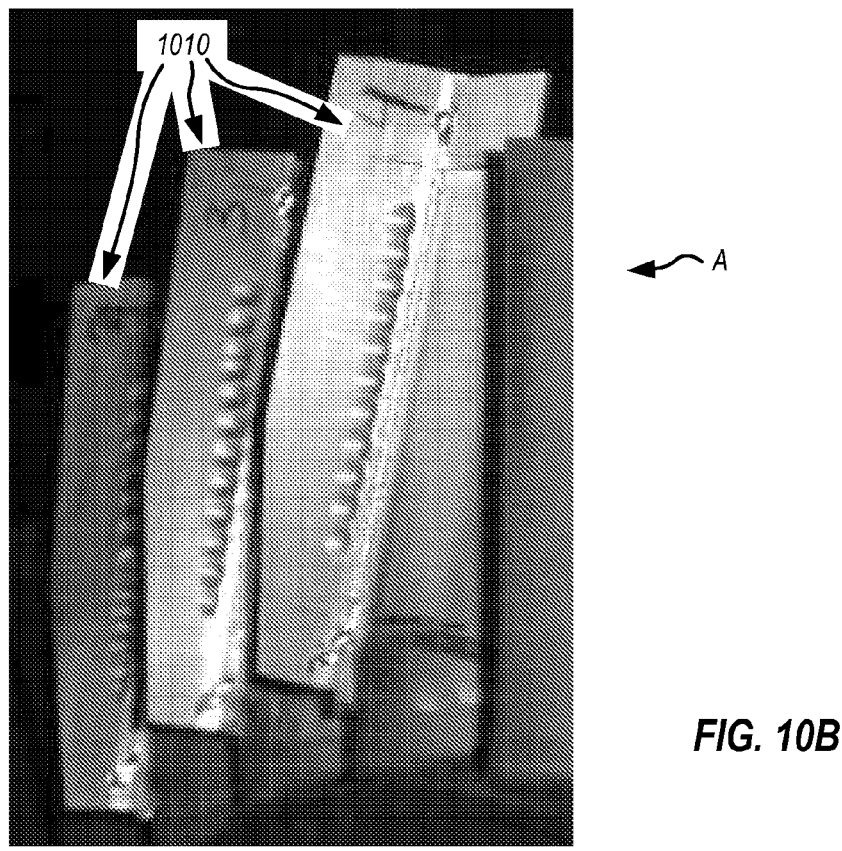
FIG. 10B is an enlarged view of a region of FIG. 10A.

FIG. 9 shows exemplary indentations 940 on a portion 900 of a welded part. Indentations 940 are along a weld line 930, as shown. Not all of indentations 940 are labeled within FIG. 9, for clarity of illustration. FIG. 10A shows welded and forged patches 1010 on an integrally bladed rotor 1000; a region that includes three welded and forged patches 1010 is denoted as A. FIG. 10B is an enlarged view of region A of FIG. 10A.

After forging disrupts the typically coarse crystal structure of a weld nugget and/or an adjacent heat affected area, a localized heat treatment recrystallizes and ages the disrupted material into a fine-grained structure typical of parent metal. The recrystallization heat treatment advantageously ramps up rapidly in temperature to retain stress from welding in the material being treated, holds at a high temperature to promote recrystallization of alloy constituents, may cool down in stages, and finally cools down quickly. However, since the heat treatment is done locally, a further goal of this heat treatment is to is to minimize processing time, both to maximize equipment utilization and to minimize risk of thermally damaging a part in areas outside the heat affected area. Table 4 provides a heat treatment schedule that is applicable to IN-100 alloy. Table 5 provides a heat treatment schedule that is applicable to Ti alloys.

TABLE 4

Recrystallization and Aging Heat Treatment Schedule for IN-100

| Step | Temperature setting/operation | Ramp rate | Notes |
| --- | --- | --- | --- |
| 4-1 | Ramp up to target of 2065 F. | As quickly as possible | Heat may be applied and/or cooling may be controlled utilizing a defocused electron beam (all steps). |
| 4-2 | Hold at 2065 F. | About 2 hours | |
| 4-3 | Ramp down to 1800 F. | Uncontrolled/ as quickly as possible | |
| 4-4 | Hold at 1800 F. | About 45 minutes | The goal of this step is to precipitate material in the gamma prime phase. |
| 4-5 | Ramp down to 1300 F. | About −200 F./min | |
| 4-6 | Hold at 1300 F. | About 8 hours | The goal of this step is to grow the gamma prime material precipitated in step 4-4, to strengthen the alloy. |
| 4-7 | Ramp down to room temp | Uncontrolled/ as quickly as possible | |

TABLE 5

Recrystallization and Aging Heat Treatment Schedule for Ti alloys

| Step | Temperature setting/operation | Ramp rate | Notes |
| --- | --- | --- | --- |
| 5-1 | Ramp up to target of 1450 F.-1750 F. | As quickly as possible | Heat may be applied and/or cooling may be controlled utilizing a defocused electron beam (all steps). |
| 5-2 | Hold at 1450 F.-1750 F. | About 30 to 60 minutes | |

TABLE 5-continued

Recrystallization and Aging Heat Treatment Schedule for Ti alloys

| Step | Temperature setting/operation | Ramp rate | Notes |
|---|---|---|---|
| 5-3 | Ramp down to 100 F-150 F. | As quickly as possible | |
| 5-4 | Hold at 100 F.-150 F. | About 1 to 4 hours | |
| 5-5 | Ramp down to room temp | Not critical | |

FIGS. 11A through 11D illustrate an improved crystallographic structure in a welded Ti assembly that was provided by local forging and heat treating, as discussed above, and FIGS. 11E and 11F show a similar improved crystallographic structure in a welded Ni assembly. FIG. 11A shows a low magnification view of a weld between Ti parts. FIG. 11B shows the same view of the same weld after forging and heat treatment. In each of FIGS. 11A and 11B, a small region is labeled "FOV B." FIG. 11C is a 100× photo micrograph of FOV B of FIG. 11A; a coarse grain structure is apparent. FIG. 11D is a 100× photo micrograph of FOV B of FIG. 11B; a much finer grain structure is apparent. FIGS. 11E and 11F are 50× photo micrographs of welded regions between IN-100 parts. FIG. 11E shows the as-welded condition, including a coarse grain structure, while FIG. 11F shows a similar region that has been forged and heat treated, producing a much finer grain structure.

Figure 12:
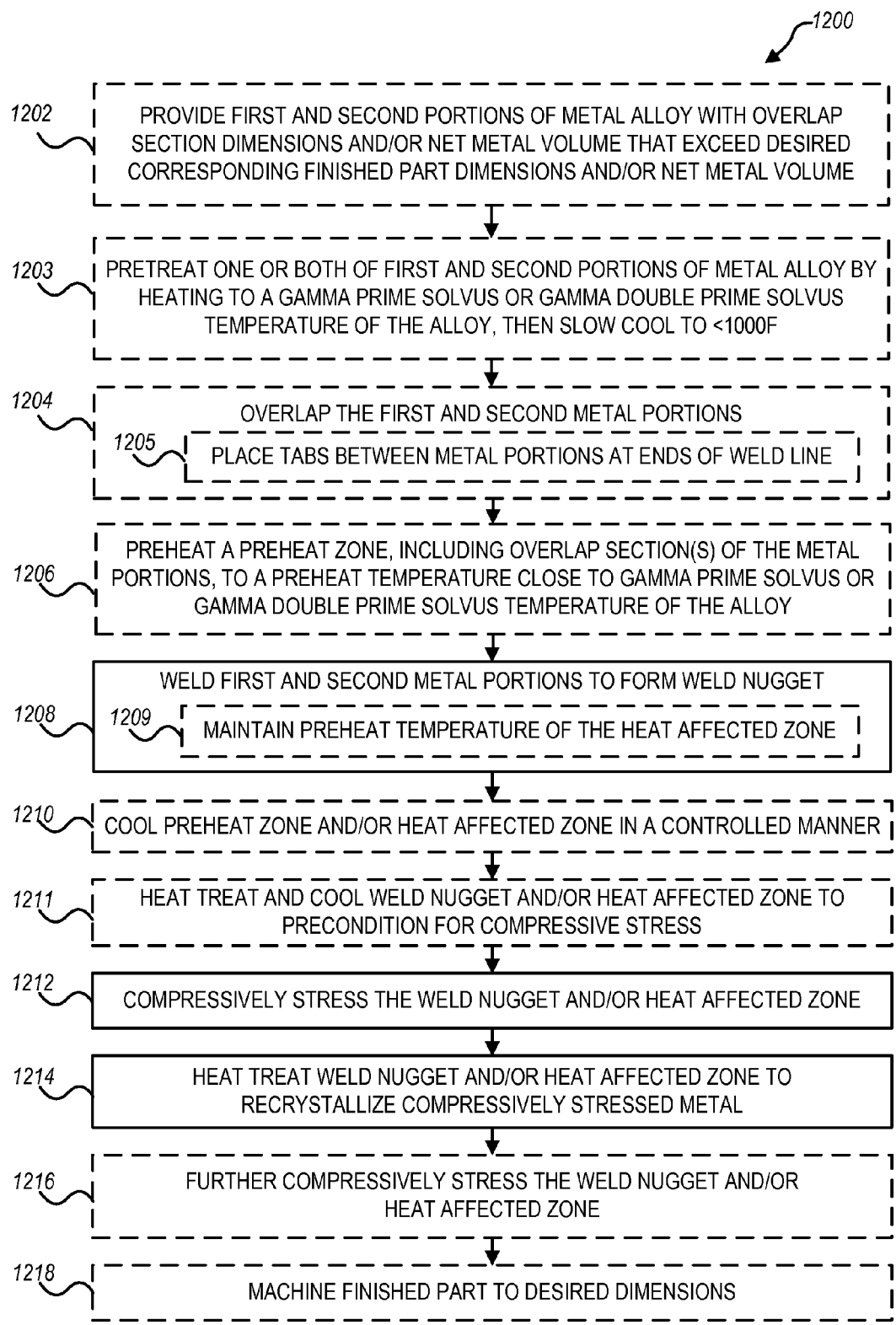
FIG. 12 is a flowchart of a metal joining method, in an embodiment.

FIG. 12 shows a flowchart of a metal joining method 1200. An optional step 1202 of method 1200 provides at least one of first and second metal portions of a metal alloy with an overlap section such that the first and second metal portions, together, have larger dimensions that desired dimensions of a finished metal part. An example of step 1202 is generating repair patch 720, FIG. 7. The overlap section may provide excess metal volume or dimensions during processing, as compared with a desired final net metal volume or dimensions of the finished metal part. This, in turn, enables (a) indentation of the metal during forging without making its dimensions smaller than desired dimensions of the finished metal part, and/or (b) excess metal to be machined away to provide the finished metal part with desired dimensions and net metal volume. The overlap section may also function as a beam stop, as discussed above, if electron beam and/or laser beam heating are utilized for welding.

Another optional step 1203 pretreats one or both of the first and second portions of metal by heating them to a pretreat temperature substantially close to a gamma prime or gamma double prime solvus temperature of the metal alloy. An example of step 1203 is utilizing the preheat temperature schedule given in Table 1. After reaching and holding at the pretreat temperature for about one hour, the pretreated portion(s) are allowed to cool at a very slow cooling rate, no faster than an 8 F/minute temperature change, and advantageously at a cooling rate of 2 F to 3 F/minute until the portion(s) are below about 1000 F. Step 1203 is utilized, for example, to decrease an amount of secondary gamma prime material in nickel-based superalloys, and improve distribution of primary gamma prime material therein, before welding. Once the temperature is below about 1000 F, the alloy is stable, so that cooling can thereafter occur at a more rapid rate. Step 1203 may be done as an independent heat treatment step, or may be done in situ in a fixture that will subsequently be utilized during welding. If done in situ, step 1203 may follow step 1204, instead of preceding it as shown in FIG. 12.

Step 1204 overlaps the first and second metal portions, for example with their respective overlap sections in contact with one another. An example of step 1204 is mounting rotor blade 700 and repair patch 720, FIG. 7, in a fixture that holds them in position for welding. Step 1204 may also, in certain embodiments, apply compression to the overlap sections. An optional step 1205 places tabs between the first and second metal portions at ends of the weld line, for continuity of the weld and later forging. An example of step 1205 is placing tabs 732, 734 at ends of weld line 730, FIG. 7. If step 1206 (below) is utilized, a fixture that positions the first and second sections may maintain compression to the overlap sections, but allow for thermal expansion during step 1206 and the following welding step 1208. For example, a spring-loaded fixture may be utilized that substantially maintains a given amount of force on the overlap sections, but yields to thermal expansion of the metal portions. That is, position and length of the spring are not substantially changed by the thermal expansion of the metal portions, so the force exerted by the spring remains substantially constant.

An optional step 1206 preheats a preheat zone that includes the overlap sections of the first and/or second metal portions, to a preheat temperature substantially close to a gamma prime or gamma double prime solvus temperature of the metal alloy. An example of optional step 1206 is preheating portions of blade 700 and repair patch 720 that are adjacent to weld line 730, FIG. 7, when blade 700 and patch 720 are formed of Ni based superalloys. The preheat temperature may be within a range of 300 degrees Fahrenheit below the gamma prime or gamma double prime solvus temperature, up to about the gamma prime or gamma double prime solvus temperature. For example, the preheat temperature may advantageously be within a range of 150 degrees Fahrenheit below the gamma prime or gamma double prime solvus temperature, up to about the gamma prime or gamma double prime solvus temperature. If one or both of the metal portions were pretreated in step 1203, it may be advantageous for the preheat temperature of step 1206 not to exceed the pretreat temperature reached in step 1203, so as not to affect the distribution of primary and secondary gamma prime material that resulted from step 1203.

Step 1206 is utilized, for example, to increase ductility of metal alloys that are susceptible to hot cracking, such as nickel-based superalloys, during welding and/or subsequent heat treatment. Titanium-based alloys and other alloys that are not susceptible to hot cracking during welding may not utilize step 1206. Electron beam heating, laser heating, induction heating and/or resistance heating may be utilized to preheat the metal portions in step 1206.

Step 1208 welds the first and second metal portions to form a weld nugget. In certain embodiments, electron beam welding is utilized in step 1208, but alternatively, laser welding may be utilized. An example of step 1208 is welding blade 700 and repair patch 720 together along weld line 730, FIG. 7. Dimensions of overlap sections (see step 1202 described above) may advantageously result in a weld nugget that can be characterized as having "positive metal" as compared to desired final dimensions and/or net metal volume of the finished part. If optional step 1206 has preheated a preheat zone to the preheat temperature, it may be desirable to perform step 1208 while the preheat zone remains at or near the preheat temperature. In the case of step 1208 performing a short weld utilizing the same equipment (e.g., a laser or electron beam) as used for preheating, the equipment can switch quickly from the preheat function to the welding function and perform the weld before the preheat zone cools significantly. For example, to make a short weld utilizing an electron beam that is also utilized for preheating, the electron beam may discontinue preheating and perform the weld in a maximum of about 10 seconds, and advantageously within about one second, from the time preheating is discontinued. An optional step 1209 maintains the preheat temperature in the vicinity of the weld (the heat affected zone) during welding itself. An example of step 1209 is maintaining the preheat temperature achieved in step 1206 in portions of blade 700 and repair patch 720 when blade 700 and patch 720 are formed of Ni superalloy. If a large weld is to be performed, it may be desirable to utilize different equipment for preheating and welding, such that the preheating equipment can remain on in an optional step 1209, to maintain the preheat temperature, while the welding is performed with other equipment. Alternatively, an electron beam or laser beam may be operated in a split raster fashion with the beam directed so as to concentrate heat for welding during part of the raster scan, and continue to provide preheating during another part of the scan.

The heat of welding in step 1208 may affect metal that is adjacent to the weld, but not molten and hardened like the weld nugget. A region adjacent to the weld nugget wherein the metal becomes at least momentarily hot enough to coarsen the grain structure is hereinafter called the "heat affected zone." The heat affected zone, like the weld nugget, may have crystalline structure that renders it weaker than metal that is unaffected by the weld. Method 1200 includes processes that strengthen the heat affected zone as well as the weld nugget, as discussed below.

After step 1208, if optional step 1206 has preheated a preheat zone to the preheat temperature, step 1210 may cool the preheat zone in a controlled manner. In one embodiment, step 1210 cools the preheat zone at a rate that is less than 500 degrees Fahrenheit per minute; in certain of these embodiments, step 1210 cools the preheat zone at a rate that is less than 100 degrees Fahrenheit per minute. An example of step 1210 is cooling blade 700 and repair patch 720, FIG. 7, after they have been welded together by utilizing a defocused electron or laser beam to keep blade 700 and repair patch 720 from cooling more rapidly.

Also after step 1208, an optional step 1211 can reheat, then cool the weld nugget and/or a heat affected zone to a temperature sufficient to develop or enhance a particular phase or grain morphology, to precondition the metal in these areas for the compressive strain applied in step 1212 and the heat treatment in step 1214 to optimize the microstructure thereof. In one embodiment, step 1211 may particularly be utilized to increase an amount of alpha phase present in a titanium alloy, by heating metal of the weld nugget and/or the heat affected zone to about 50 F below the beta transus temperature of the alloy. In other embodiments, step 1211 may similarly manipulate the amount or distribution of phases present in nickel based alloys. During the cooling portion of step 1211, the metal cooling rate preconditions the weld nugget and a heat affected zone similarly to the cooling of step 1210. Step 1211 must be done after welding, because the temperatures reached during welding would undo the effects of step 1211 were it to be done before welding. An example of step 1211 is locally heat treating blade 700 and repair patch 720, FIG. 7, along weld line 730 when blade 700 and repair patch 720 are made of Ti alloy.

Step 1212 compressively stresses the weld nugget and the heat affected zone. In embodiments, step 1212 forges or indents the weld nugget and the heat affected zone with a series of overlapping indentations to create a uniform strain field in the area that is stressed. An example of 1212 is forging blade 700 and repair patch 720 with indentations 740, as shown in FIG. 7. The overlapping indentations may span a length of the weld nugget or the heat affected zone; that is, successive indentations may be formed continuously from one end of the weld nugget or the heat affected zone to the other end. The degree of overlap of the indentations may be, for example, 10% to 50% of a primary dimension of each indentation, and it may be desirable for the overlap to be 30% to 40% of the primary dimension. The pattern, degree of overlap, depth and sequence of indentations may be analytically and/or empirically optimized to meet goals such as strain field amount, strain field uniformity and/or processing time for the indentation step. In some embodiments, an outer ring of incremental indentations that provide a lower range of upset, and an inner row of indentations that provide a higher range of upset, may be utilized. The lower range of upset may be in the range of 2% to 30% upset, and it may be desirable for the lower range of upset to be in the range of 5% to 10% upset. The higher range of upset may be in the range of 10% to 50% upset and it may be desirable for the higher range of upset to be in the range of 10% to 30% upset. The indentations may be applied in an alternating pattern starting at opposite ends of the weld nugget or the heat affected zone and progressing towards the center thereof. The upper ranges of upset noted here may not apply to all alloys, specifically, alloys with high work hardening coefficients may not withstand the upper ranges of upset without cracking. Furthermore, the pattern and overlap of indentation patterns may be similarly limited; materials with high work hardening coefficients may be limited to combinations of less upset and/or lower density patterns of indentation.

A key feature of embodiments herein is that the stress imparted by step 1212 can act in concert with heat treatment to recrystallize the stressed metal. Step 1214 heat treats at least the weld nugget, and optionally a heat affected zone, to recrystallize the stressed metal, such that the weld nugget and/or the heat affected zone take on the parent metal metallurgical characteristics. Recrystallization of the forged metal may result in apparent "disappearance" of the weld nugget on a macro scale; that is, after recrystallization, the weld nugget and the heat affected zone may have the fine, equiaxed grain structure of the surrounding metal so as to be substantially or completely indistinguishable from it. At a microstructural scale, the resulting structure may remain distinguishable from the parent metal structure, but will be very different from the typically coarse grains of a weld nugget left untreated. For example, if one uses the well known ASTM-112 grain size measurement scheme to evaluate original and repair sections of metal, and a weld nugget therebetween, an untreated weld nugget may have crystals that are 4 or more grain sizes larger than the original and repair sections. When the techniques discussed here are utilized to treat the weld nugget, the weld nugget will typically recrystallize to the same grain size as the original and repair sections, within +/−3 ASTM-112 grain sizes. In certain embodiments, the weld nugget will recrystallize to the same grain size as the original and repair sections, within a range of +/−2 or even 1 ASTM-112 grain sizes. In certain embodiments, recrystallization of stressed metal can result in grain structure and strength of the weld nugget and/or heat affected zone that are superior to the respective grain structure and strength of the parent metal.

An optional step 1216 again compressively stresses the weld nugget and/or the entire heat affected zone to impart a deep, or even through-thickness, compressive stress to the finished part. Examples of step 1216 are to locally forge or indent a weld nugget and/or heat affected zone, or to sandwich a target metal part between similar, sacrificial metal parts and indent the sacrificial metal parts to transfer stress to the target part, as discussed further below. An optional step 1218 machines the finished part to desired final dimensions. An example of step 1218 is machining the repaired part formed by welding blade 700 to repair patch 720, FIG. 7, and thereafter machining off excess metal of repair patch 720 so that the repaired blade is dimensionally identical to an undamaged blade. Steps 1216 and 1218 may be performed in reverse order, or may be repeated. In particular, step 1218 may first provide rough machining, but leave enough excess metal that dimensions of the part can be further reduced by forging without going below the required final dimensions. Then, step 1216 may compressively stress the weld nugget or the heat affected zone, and step 1218 may be repeated as finish machining to provide the final dimensions of the finished part.

Figure 13:
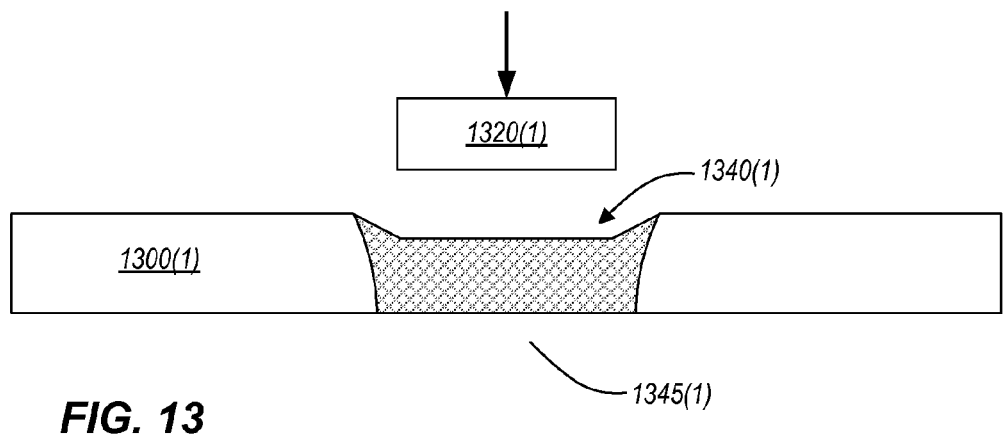
FIG. 13 schematically illustrates effects imparted to a target metal element by a tool that indents the target metal element from a single side, in an embodiment.

Improving Fatigue Strength in Ni and Ti Alloys Through Forging and Optional Heat Treatment FIG. 13 schematically illustrates effects imparted to a target metal element 1300(1) by a tool 1320(1) that indents element 1300(1) from a single side, while element 1300(1) rests on a hard surface. FIG. 13 illustrates that the deformation of element 1300(1) is asymmetric; for example, an indentation 1340(1) occurs only in a top surface thereof, and a stressed region 1345(1) within element 1300 tapers away from tool 1320(1).

Figure 14:
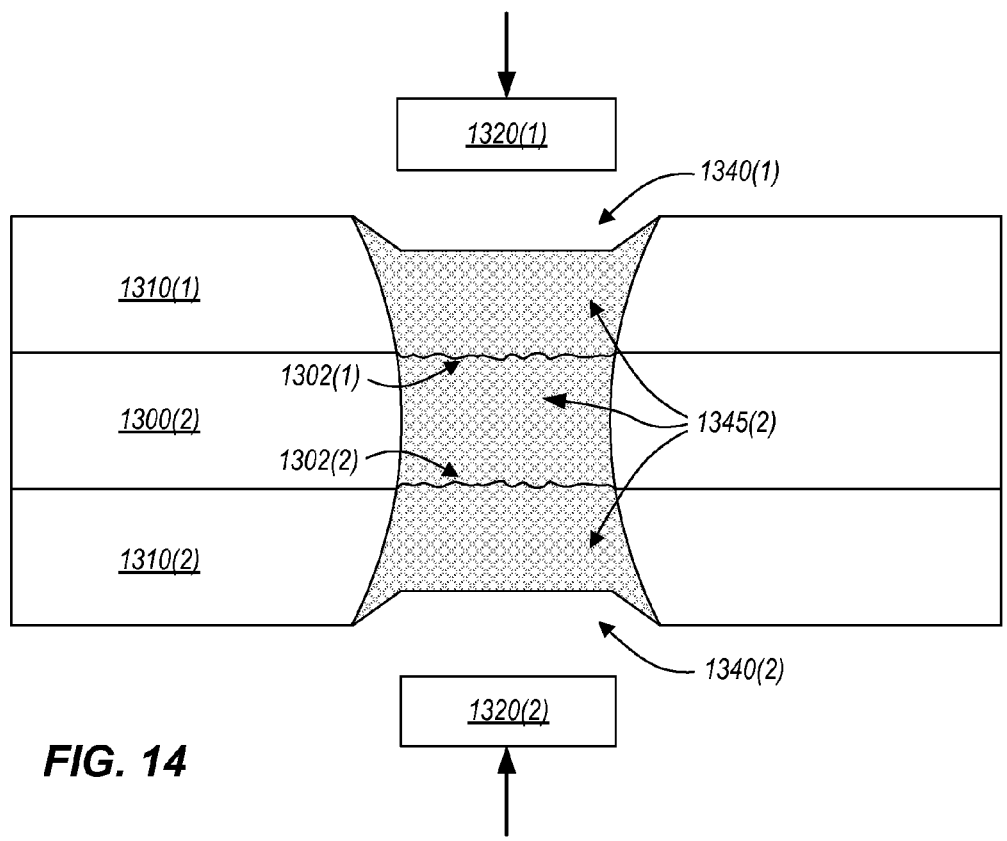
FIG. 14 schematically illustrates effects imparted to a target metal element by sandwiching the element between sacrificial elements and indenting the sacrificial elements from two sides, in an embodiment.

FIG. 14 schematically illustrates effects imparted to a target metal element 1300(2) by sandwiching element 1300(2) between sacrificial elements 1310(1), 1310(2), and indenting the sacrificial elements from two sides. Tools 1320(1), 1320(2) produce indentations 1340(1), 1340(2) in sacrificial elements 1310(1), 1310(2) respectively, and produce a stressed region 1345(2) that extends throughout sacrificial elements 1310(1), 1310(2) and target element 1300(2). However, the portion of stressed region 1345(2) that extends through element 1300(2) is symmetrical and has roughly vertical sides. Therefore, using sacrificial elements 1310(1), 1310(2) makes it possible to control stressed region 1345(2) in element 1300(2) such that adjacent regions can be stressed uniformly, without significant overstress or understress of any particular area. A slight "orange peel" roughening may occur at top and bottom surfaces 1302(1), 1302(2) of element 1300(2) where they meet opposing surfaces of sacrificial elements 1310(1), 1310(2); this roughening can be machined away later to leave stressed region 1345(2) in element 1300(2) uniformly stressed throughout its entire volume.

By utilizing sacrificial elements in this manner, a column of uniform, through thickness compressive stress may be imparted to a target element with essentially no surface deformation. FIG. 14 shows that stressed region 1345(2) is somewhat narrower than the indentations 1340(1), 1340(2) causing it; therefore, to provide a uniform volume of stress throughout a portion of the target element, adjacent indentations may overlap so that adjacent columns of stress are approximately adjacent to one another. Also, making the upper and lower elements approximately the same thickness as each other and the target element, and making the upper and lower indentations symmetrical with one another, may promote uniformity of the stress columns.

Figure 15:
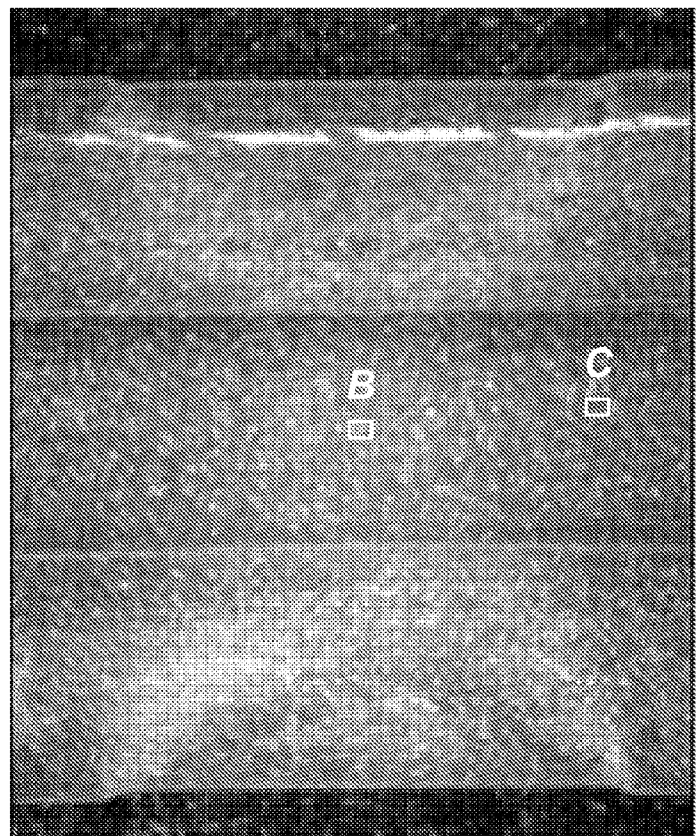
FIG. 15 is a photo macrograph of a three-element stack of IN-718, showing evidence of the ability to transfer the stain induced by forging of upper and lower elements across interface surfaces with a central, target element, in an embodiment.

FIG. 15 is a photo macrograph of a three-element stack of IN-718, showing evidence of the ability to transfer the stain induced by forging of upper and lower elements across interface surfaces with a central, target element. The entire three-element "sandwich" was forged from top and bottom, causing the indentations visible in the photo macrograph. Following the indentation, the entire stack was heat treated, cross-sectioned and imaged. A central portion of the target element completely recrystallized in the thermal cycle. An area at the center of the column of stress visible in FIG. 15 is denoted as area B, while an area outside of the column of stress is denoted as area C.

Figure 16:
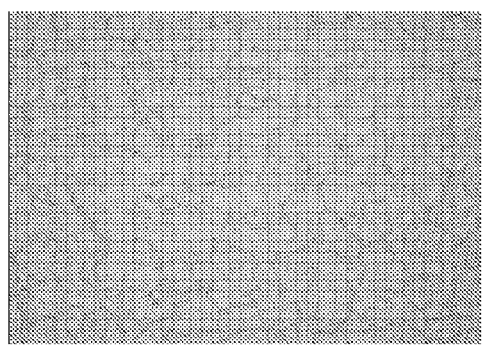
FIG. 16 is a higher magnification photograph of an area shown in FIG. 15, in an embodiment.
Figure 17:
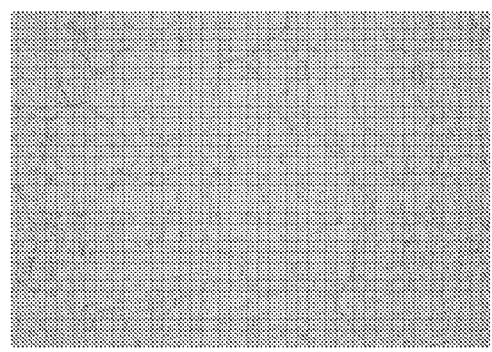
FIG. 17 is a higher magnification photograph of an area shown in FIG. 15, in an embodiment.

FIGS. 16 and 17 are higher magnification photographs of areas B and C respectively as shown in FIG. 15. The grain structure imaged in FIG. 16 (area B, at the center of the stress column) is clearly finer than the grain structure in FIG. 17 (area C, outside the column). This verification of the capability to transfer strain across an interface shows that this technique can be utilized to impart compressive residual stresses to a rough- or finish-machined component to enhance its fatigue strength and thereby extend part life without detrimental effects to its surface. If necessary, a part can be "oversized" as originally manufactured so that the "orange peel" surface can be machined away to meet final dimensional specs. More specifically, this methodology may be utilized on components such as a rotor following metallurgical restoration of damage, to enhance its fatigue strength. Alternatively, this methodology can be utilized to impart compressive residual stresses for subsequent thermal processing to recrystallize a weld nugget.

In certain cases, the center element of the three-element stack may be a contoured shape of a component to which compressive stress is to be imparted. To accommodate the contoured surface, the upper and lower sacrificial elements can be appropriately contoured to match the contour of the target, enabling strain transfer to the center element. Alternatively, a medium such as granulated Silica could be used to transfer stress from upper and lower elements to a center, target element during forging.

Figure 18:
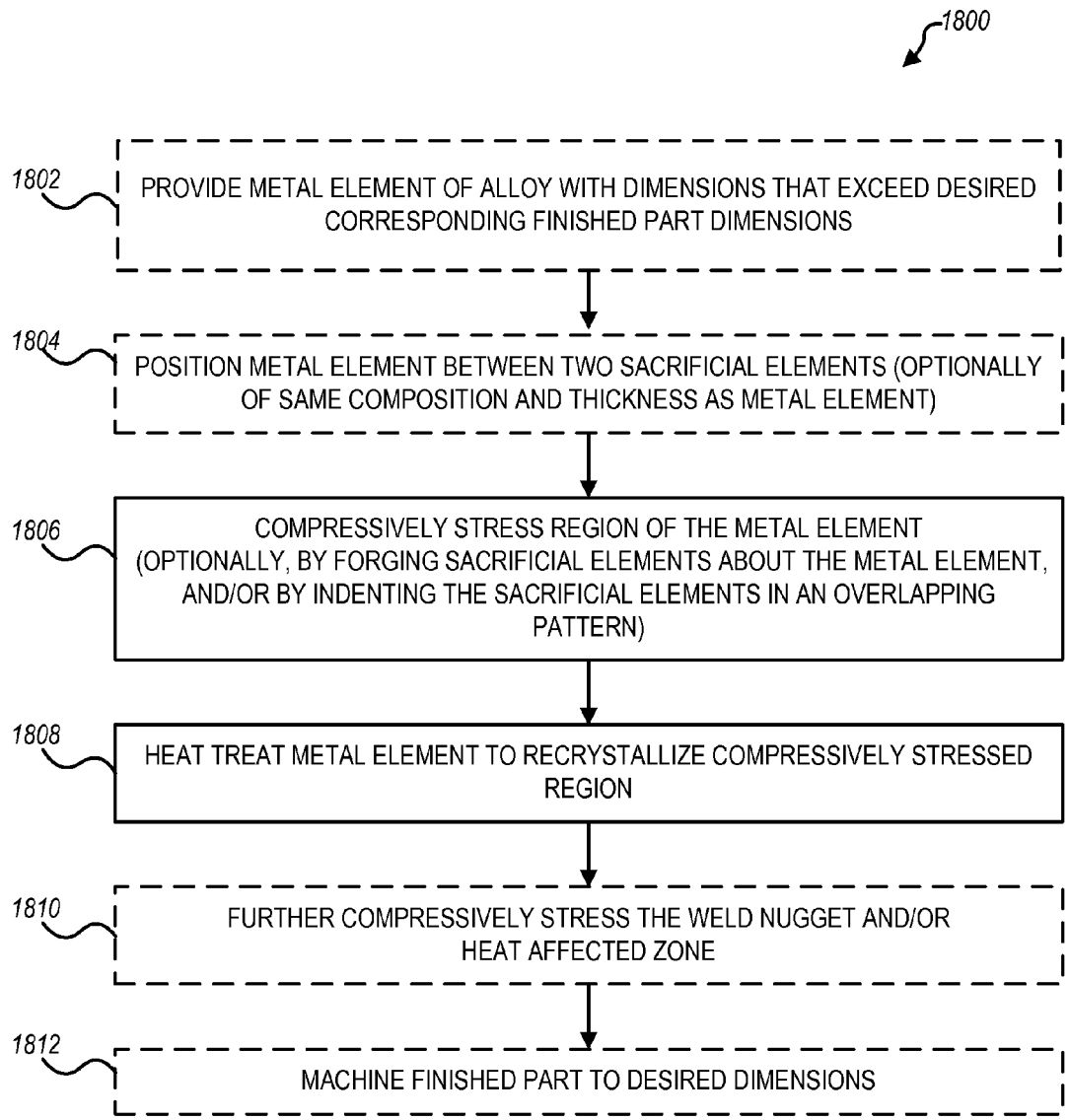
FIG. 18 is a flowchart of a method for strengthening a metal element, in an embodiment.

FIG. 18 is a flowchart of a method 1800 for strengthening a metal element. An optional step 1802 of method 1800 provides a metal element of a metal alloy with one or more dimensions that exceed corresponding desired dimensions of a finished part. This enables (a) compression of the metal during stressing without making its dimensions smaller than desired dimensions of the finished metal part, and/or (b) machining excess metal away to provide the finished metal part with desired dimensions and net metal volume. Another optional step 1804 positions the same metal element between two sacrificial elements. The sacrificial elements may be, for example, made of the same substance and be of the same thickness as the metal element.

Step 1806 compressively stresses a region of the metal element of step 1802. An example of step 1806 is forging the sacrificial elements symmetrically about the metal element by applying substantially similar tools to outer surfaces of the sacrificial element, with the metal element in the middle, to apply compressive stress to a small region of the metal element (e.g., the region of the metal element that is between the similar tools). A further example of step 1806 is indenting the sacrificial elements by applying a tool on each of their outer surfaces, effectively squeezing the metal element in the middle, and repeating this action to form overlapping indentations across a larger region of the metal element. Each such indentation generates a strain field between the tools, including through the metal element. The strain field may bow outwards from the applied tools in the vicinity of the tools, and indentations may be generated in the sacrificial elements, but the strain field may narrow as it extends further into the metal element, that is, near the midpoint between the tools. To compensate for the narrowing of the strain field, the indentations should overlap so that the strain fields of adjacent indentations roughly abut one another within the metal element, to provide a continuous and generally uniform strain field throughout the larger region.

Step 1808 heat treats the metal element to recrystallize the compressively stressed region of the metal element. This may, for example, result in the stressed and treated metal having a fine, equiaxed grain structure that is stronger than the original metal of the metal element. An optional step 1810 again compressively stresses the metal element to impart a through-thickness compressive stress to the finished part. Like step 1806, examples of step 1810 include forging sacrificial elements symmetrically about the metal element by applying substantially similar tools to outer surfaces of the sacrificial element, with the metal element in the middle, to apply compressive stress to a small region of the metal element, or indenting the sacrificial elements by applying a tool on each of their outer surfaces, effectively squeezing the metal element in the middle, and repeating this action to form overlapping indentations across a larger region of the metal element. An optional step 1812 machines the finished part to desired final dimensions.

Method 1800 may have several uses. For example, method 1800 may be utilized to increase the strength of an original metal part, or may be used to "rejuvenate" parts; that is, to restore the parts after a period of use, to their original strength or better. This may be particularly advantageous for use by high speed gas turbine engine manufacturers who, faced with aging turbine components, must decide whether to allow partially "worn out" rotors to return to service, or replace them entirely at a cost of the tens or hundreds of thousands of dollars. "Rejuvenating" such rotors through mechanical processing as described in method 1800 has a projected cost on the order of thousands of dollars.

Use of Additive Processing after Welding to Create Positive Metal for Compression and/or Machining to Final Tolerances As discussed above, it is advantageous in embodiments to overlap material being welded so that extra material is available that can be forged or machined down to a final desired shape and/or dimensions. When a new item is being generated in this manner, providing extra material can be designed into the parts to be welded together. However, when a part is being repaired, the part generally has the final desired shape and/or dimensions right up to the damaged area, or at least to an edge generated by cutting off the damaged area. Therefore in repair applications, it becomes difficult to forge or machine material up to but not beyond the edge of the repair. There is a risk that metal immediately adjacent to the edge of the part under repair will either not be forged and recrystallized for maximum strength, or will be indented by forging such that the desired final dimensions cannot be achieved.

Figure 19:
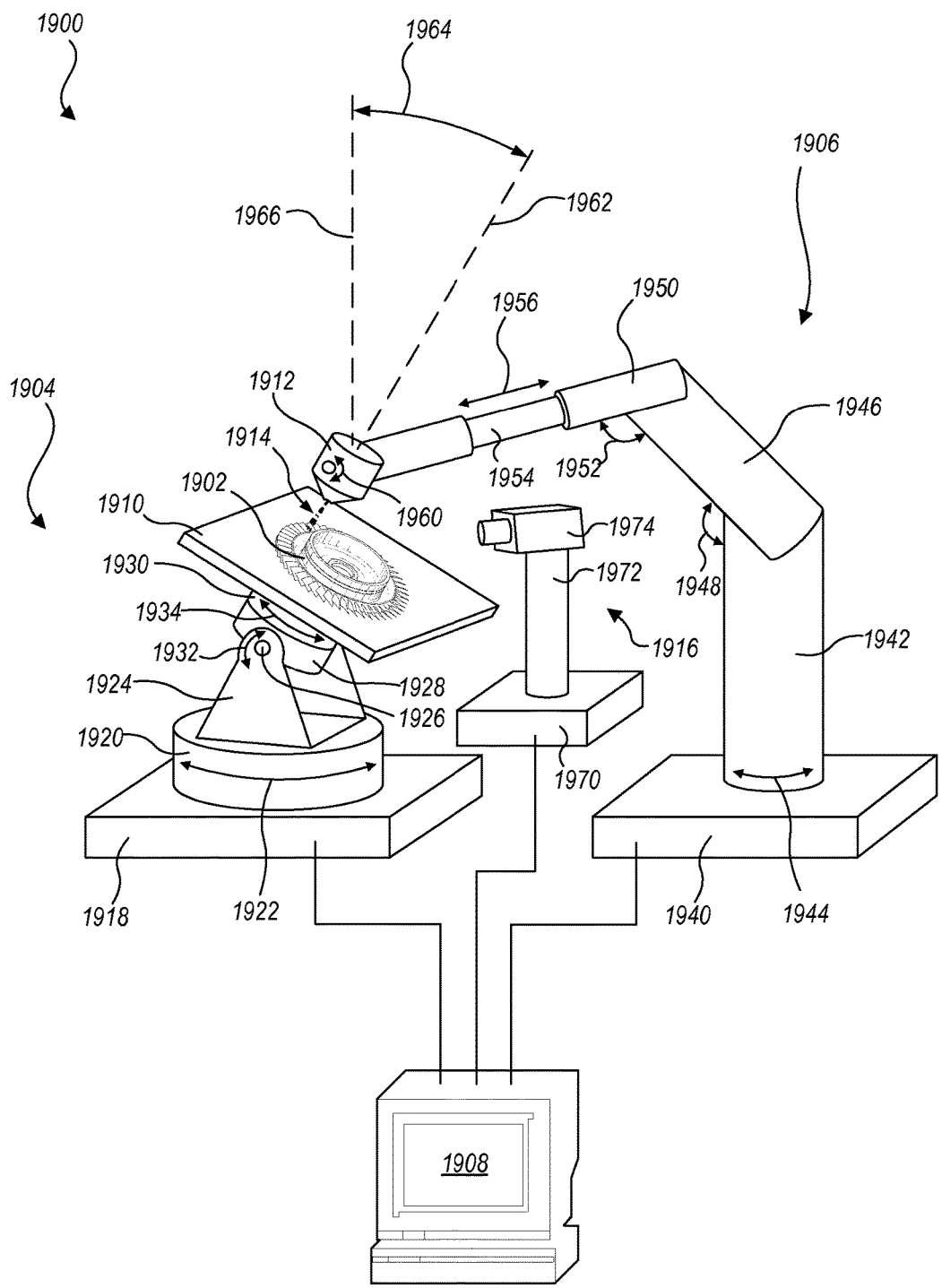
FIG. 19 schematically illustrates an additive manufacturing cell, in an embodiment.

A technology that can be utilized to address the problem of starting with final metal dimensions at an edge of a repair, or even to perform a complete repair without welding parent metal parts together, is additive manufacturing. FIG. 19 schematically illustrates an additive manufacturing cell 1900, shown adding material to a rotor 1902. Cell 1900 includes a substrate manipulator 1904 and a deposition manipulator 1906 in proximity with one another and under control of a computer 1908. Manipulator 1904 holds a deposition substrate 1910, and manipulator 1906 holds a deposition head 1912, such that deposition head 1912 deposits metal 1914 on rotor 1902, positioned on substrate 1910. Cell 1900 may also include one or more optional sensor assemblies 1916 for sensing location information of features or surfaces of the item being repaired.

Manipulator 1904 includes a base 1918. A rotational stage 1920 couples with base 1918 and takes a rotational position in the direction of arrow 1922 under control of computer 1908. A mount 1924 on stage 1920 includes an axle 1926. A base 1928 of a second rotational stage 1930 takes a rotational position in the direction of arrow 1932, about axle 1926, under control of computer 1908. Second rotational stage 1930, holding deposition substrate 1910, takes a rotational position in the direction of arrow 1934. It can thus be seen that deposition substrate 1910 provides several degrees of freedom in terms of presenting surfaces of rotor 1902 to receive metal 1914.

Manipulator 1906 includes a base 1940. A support 1942 mounts on base 1940 and takes a rotational position in the direction of arrow 1944 under control of computer 1908. A first arm section 1946 couples with support 1942 and moves to an angle along the direction of arrow 1948 under control of computer 1908. A second arm section 1950 couples with first arm section 1946 and moves to an angle along the direction of arrow 1952 under control of computer 1908. Second arm section 1950 includes a linear transducer 1954 that contracts or extends a length of second arm section 1950 along the direction of arrow 1956 under control of computer 1908. Deposition head 1912 couples with second arm section 1950 and moves to an angle along the direction of arrow 1960. Deposition head 1912 deposits metal 1914 in the direction of an axis 1962. Current deposition technology allows a maximum allowable deposition angle 1964 between axis 1962 and vertical (indicated by line 1966) of about 35 degrees; however it is appreciated that advances in deposition technology may increase the maximum allowable deposition angle, providing further manufacturing flexibility.

Optional sensor assembly 1916 may include a base 1970, an optional manipulator 1972 and a sensor 1974 that may be, for example, an optical or tactile sensor. Sensor 1974 is capable of gathering location information about the item being built, for process control purposes. Sensor 1974 may in particular be an optical scanner capable of generating three-dimensional information about the item being built. Sensor 1974 is controlled by, and sends location information of the item being built to, computer 1908.

It is appreciated that the specific mechanical features, and types and ranges of motion of manipulators 1904, 1906 and 1972 are exemplary only, and that other types of fixtures may be utilized to position deposition head 1912 and sensor 1974 with respect to deposition substrate 1910. For example, more or fewer rotational stages or linear transducers may be utilized, or may be utilized in differing ways, than are shown in manipulators 1904, 1906 and 1972. Manipulators 1904, 1906 and 1972 may be fixed to respective bases 1918, 1940 and 1970 as shown, or may be mounted to a common base. Other types of manipulators may be utilized that provide similar or additional degrees of freedom in manipulating a substrate, deposition and/or machining heads, and sensors.

Computer 1908 denotes any combination of computers and/or networking resources, and is not limited to being a single computer connected solely to the other components of manufacturing cell 1900. Computer 1908 may include two or more computers that coordinate activity of individual components of manufacturing cell 1900, and/or interface with other computers. For example, computer 1908 may interface with a computer aided manufacturing system (not shown) that stores numerical control programs for manufacturing cell 1900, downloads such programs to computer 1908, and receives quality control information and manufacturing status information from computer 1908. Computer 1908 may interface with other computers through wired or wireless connections, or over the Internet.

Figure 20:
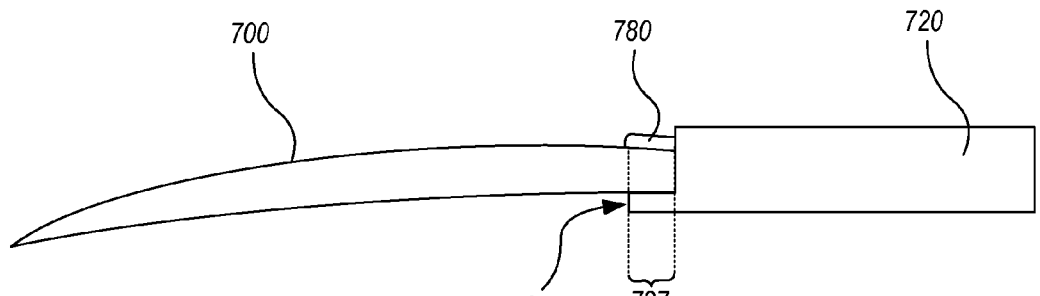
FIG. 20 schematically illustrates metal that is added, utilizing additive manufacturing, to a rotor blade before the blade is welded to a repair patch, in an embodiment.

FIG. 20 schematically illustrates metal 780 that is added, utilizing additive manufacturing, to rotor blade 700 before blade 700 is welded to repair patch 720. Blade 700, repair patch 720 and flange 725 of patch 720 are as shown in FIG. 7. Metal 780 is added to provide extra metal so that forging does not reduce blade 700 to a dimension below a corresponding, desired finished rotor dimension. FIG. 20 shows metal 780 added in overlap region 727, but it is not critical to map extra metal to the overlap region. Two factors involved in adding metal 780 are (1) controlling temperature of the additive manufacturing process and (2) controlling where metal 780 is added. Temperature control may be advantageous so that the added metal (metal 780) successfully integrates with the parent metal (blade 700), yet the temperature does not unduly disturb metallurgy of the parent metal. Location control may be advantageous because much of added metal 780 will later be machined away, so the less metal is added, the less will need to be removed.

Figure 21:
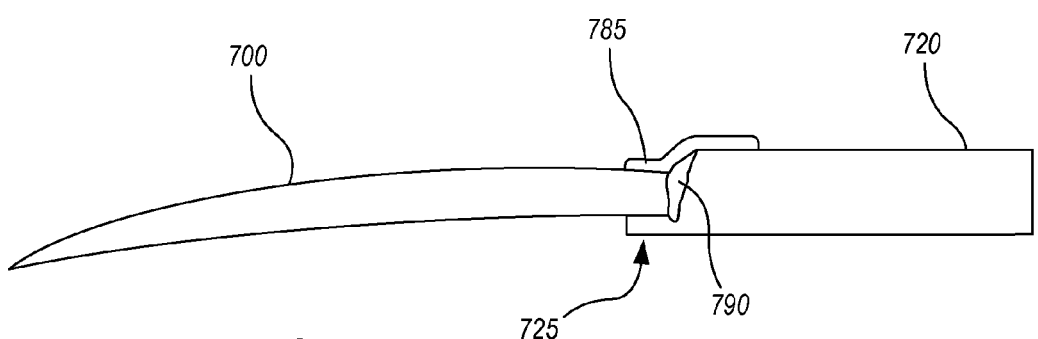
FIG. 21 schematically illustrates metal that is added, utilizing additive manufacturing, to a rotor blade after the blade is welded to a repair patch, in an embodiment.

FIG. 21 schematically illustrates metal 785 that is added by utilizing additive manufacturing to rotor blade 700, after blade 700 is welded to repair patch 720. Blade 700, repair patch 720 and flange 725 of patch 720 are as shown in FIG. 7 and FIG. 20; a weld nugget 790 formed by welding patch 720 to blade 700 is also shown. Metal 785 is added to provide extra metal so that forging does not reduce blade 700 to a dimension below a corresponding, desired finished rotor dimension. FIG. 20 shows metal 780 added in overlap region 727 and continuing up weld nugget 790 onto patch 720, but it is not critical that metal 785 be applied exactly as shown. The same considerations discussed above about temperature and location control during addition of metal 780 apply to addition of metal 785.

Figure 22:
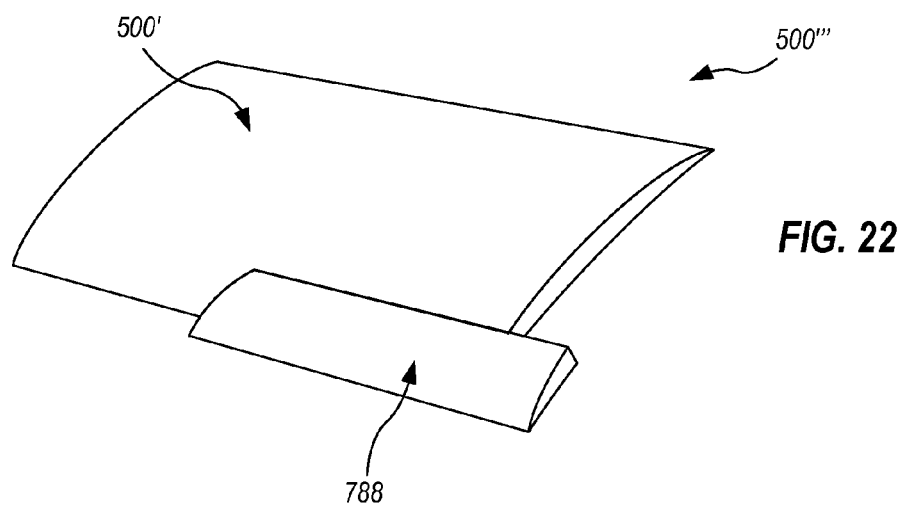
FIG. 22 schematically illustrates a repaired rotor blade formed by adding metal to a rotor blade utilizing an additive manufacturing process, in an embodiment.

FIG. 22 schematically illustrates a repaired rotor blade 500''' formed by adding metal 788, utilizing additive manufacturing, to rotor blade 500' that represents blade 500 after a section is removed (e.g., by cutting out a damaged portion, see FIG. 5B). Performing an entire repair by utilizing additive manufacturing to add all the metal required for the repair allows great flexibility in oversizing the metal that is added to produce the repair. For example, the added metal can be minimally larger than the final desired dimension of the rotor, because a beam stop geometry (see flange 725, FIGS. 7A, 7B) may not be required; also it is possible to add metal on top and bottom surfaces of the part being repaired, to enable some degree of forging of the edge of the damaged part, in the same setup as the repair metal is being added.

When the composition of the added metal matches the parent metal exactly, forging and recrystallization as described above can produce a repair wherein crystal grain size of the repair matches that of the parent metal at least within +/−3 ASTM-112 grain sizes or better, as described above.

Applicability of Disclosure and Combinations of Features.

While the examples described in this disclosure relate to joining metal portions for the purpose of repairing rotors made of titanium- or nickel-base superalloys, it will be appreciated by those skilled in the art that the methods described and claimed herein may be useful in other metal joining applications. For example, the methods may be utilized to join metals of alloys based on metals other than titanium or nickel, and the object formed thereby may be used for any appropriate purpose. Compressively stressing metals may include forging, as described, but may also include other ways of stressing metals or introducing a strain field thereinto, such as use of high pressure liquids, or sound or shock waves. Application of the methods described herein to such other alloys or objects may thus be considered to fall within the scope of the disclosed embodiments.

The principles discussed herein are understood to be combinable with each other in any combination except where physically incompatible. Features described above as well as those claimed below may be combined in various ways without departing from the scope hereof. The following examples illustrate possible, non-limiting combinations the present invention has been described above, it should be clear that many changes and modifications may be made to the process and product without departing from the spirit and scope of this invention:

(a) A method for joining first and second metal portions includes welding together the first and second portions such that a weld nugget joins the first and second metal portions, compressively stressing the weld nugget throughout its volume, and heat treating the compressively stressed weld nugget to recrystallize metal therein.

(b) The method denoted as (a) may further include overlapping the first metal portion with a flange of the second metal portion before the welding; if the welding utilizes an electron beam or a laser beam, the flange may act as a beam stop during the welding.

(c) In any of the methods denoted as (a) and (b), the welding may generate an as-welded structure having at least one dimension that exceeds a desired dimension of a corresponding portion of a finished metal part. The method may include machining the as-welded structure to remove metal and provide the finished metal part with the desired dimension.

(d) In any of the methods and/or combinations denoted as (a) through (c), metal may be added to at least one of the first metal portion, the second metal portion and an as-welded structure, utilizing an additive manufacturing process, before the steps of compressively stressing and/or machining, to generate the at least one dimension that exceeds the desired dimension.

(e) Any of the methods and/or combinations denoted as (a) through (d) may further include pretreating one or both of the first and second metal portions by heating one or both of the first and second metal portions to a pretreat temperature substantially at one of a gamma prime solvus temperature and a gamma double prime solvus temperature of a metal alloy forming the first and second metal portions; and cooling the one or both of the first and second metal portions to a temperature less than about 1000 degrees Fahrenheit, at a cooling rate that does not exceed 8 degrees Fahrenheit per minute. The cooling rate may be less than 3 degrees Fahrenheit per minute.

(f) In any of the methods and/or combinations denoted as (a) through (e), the welding can include welding the first and second portions that are formed of one of a titanium-based alloy and a nickel-based alloy.

(g) In any of the methods and/or combinations denoted as (a) through (f), the heat treating can include heating at least the weld nugget to a temperature sufficient to recrystallize metal thereof. And in these methods, the heat treating can include heating at least the weld nugget to a temperature that, in combination with the compressively stressing, is sufficient to recrystallize metal thereof to a parent metallurgical state of the first and second metal portions.

(h) Any of the methods and/or combinations denoted as (a) through (g) may further include maintaining a substantially constant force on the first and second metal portions during the step of welding, while allowing for thermal expansion of at least one of the first and second metal portions.

(i) Any of the methods and/or combinations denoted as (a) through (h) may utilize electron beam welding, laser welding, induction heating or resistance heating.

(j) In any of the methods and/or combinations denoted as (a) through (i), compressively stressing may include indenting the weld nugget and/or an adjacent heat affected zone with a series of overlapping indentations. Each of the overlapping indentations may have a primary dimension, and each of the indentations may overlap an adjacent one of the indentations by 10% to 50% of the primary dimension, especially, each of the indentations may overlap an adjacent one of the indentations by 20% to 40% of the primary dimension.

(k) Any of the methods and/or combinations denoted as (a) through (j) may further include stressing the weld nugget subsequent to the step of heat treating.

(l) In any of the methods and/or combinations denoted as (a) through (k), when the first and second portions that are formed of a nickel-based alloy, the method or combination may include preheating a preheat zone that includes overlap sections of each of the first and second metal portions, to a preheat temperature substantially close to one of a gamma prime solvus temperature and a gamma double prime solvus temperature of the nickel-based alloy forming the first and second metal portions, before the welding; and the welding may include performing the welding while the preheat zone remains substantially at the preheat temperature, and the step of compressively stressing may include forging the preheat zone.

(m) In any of the methods and/or combinations denoted as (a) through (l), when the welding is performed with equipment utilized for preheating, the equipment may perform the welding within 10 seconds of discontinuing the preheating, and especially may perform the welding within one second of discontinuing the preheating. Alternatively, the welding may include maintaining the preheat zone at the preheat temperature.

(n) In any of the methods and/or combinations denoted as (a) through (m), when preheating is performed, the preheating may include heating a preheat zone to a temperature within a range of 300 degrees Fahrenheit below the one of the gamma prime and the gamma double prime solvus temperatures, to the respective gamma prime or gamma double prime solvus temperature, and may especially include heating a preheat zone to a temperature within a range of 150 degrees Fahrenheit below the one of the gamma prime and the gamma double prime solvus temperatures.

(o) In any of the methods and/or combinations denoted as (a) through (n), when preheating is performed, the method or combination may include cooling a preheat zone at a rate of 100 degrees Fahrenheit, or less, per minute.

(p) Any of the methods and/or combinations denoted as (a) through (o) may include forging at least one of the weld nugget and a heat affected zone adjacent to the weld nugget to impart a compressive stress thereto, subsequent to the step of heat treating.

(q) A method for strengthening a metal element includes imparting a compressive stress within a region of the metal element, and heat treating the metal element, such that metal of the region recrystallizes with a finer grain structure than was present in the region before the step of imparting the compressive stress. Details of the techniques denoted in any of the methods and/or combinations (a) through (p) may be utilized in combination with this method.

(r) In the method denoted as (q), imparting may include positioning the metal element between two sacrificial elements, and forging the sacrificial elements to impart the compressive stress to the metal element therebetween, and may especially include utilizing sacrificial elements of substantially identical thickness and/or material as the metal element, and/or indenting the sacrificial elements symmetrically about the metal element.

(s) In the methods denoted as (q) and/or (r), the indenting may provide a strain field that extends uniformly through the metal element, and the methods may further include overlapping the indenting across surfaces of the region such that the strain fields of adjacent indentations substantially abut to provide a uniform strain field throughout the region. In these methods, the overlapping may include overlapping adjacent indentations by 10% to 50% of a primary dimension of the indentation, and especially may include overlapping adjacent indentations by 20% to 40% of a primary dimension of the indentation.

(t) In the methods and/or combinations denoted as (q) through (s), imparting compressive stress may include imparting the compressive stress to the metal element having one or more dimensions that exceed desired dimensions of a finished metal part, and may further include machining the metal element after heat treating to provide the finished metal part with the desired dimensions.

(u) Any of the methods and/or combinations denoted as (q) through (s) may further include adding metal to the metal element utilizing an additive manufacturing process prior to imparting the compressive stress.

(v) In the methods and/or combinations denoted as (q) through (u), imparting compressive stress may include imparting the compressive stress to the metal element that is formed of one of a titanium-based alloy and a nickel-based alloy.

(w) A rotor for use in an aircraft engine may be repaired by welding together a portion of a damaged blade of the rotor and a portion of metal to form a weld nugget, compressively stressing the weld nugget throughout its volume, and heat treating the compressively stressed weld nugget to recrystallize metal therein. Details of the techniques denoted in any of the methods and/or combinations (a) through (v) may be utilized in combination with this method.

(x) In the rotor denoted as (w), after the welding, the weld nugget and/or the portion of metal may have at least one dimension that exceeds a desired dimension of the rotor as repaired, and the weld nugget and/or the portion of metal may be subsequently machined to provide the rotor with the desired dimension. Also, the portion of the damaged blade may overlap with a flange of the portion of metal before the welding; metal may be added to at least one of the portion of the damaged blade and the weld nugget, utilizing an additive manufacturing process, before the compressively stressing the weld nugget; the portion of metal is compressed against the portion of the damaged blade during the welding; compressively stressing may include indenting the weld nugget with a series of overlapping indentations; and/or the weld nugget may be compressively stressed subsequent to the step of heat treating. An aircraft engine may include the repaired rotor.

(y) A welding jig may include a spring loaded fixture for positioning first and second metal portions for welding, wherein a spring applies constant force between the first and second metal portions while allowing one or both of the first and second metal portions to expand thermally during the welding.

(z) A repaired metal part may include a first, original section made of metal alloy, and a second, repair section of metal alloy joined to the original section by a recrystallized weld having crystals within +/−3 ASTM-112 grain sizes of the grain size of crystals of the original and repair sections. The repaired metal part may be formed utilizing the details of any of the methods and/or combinations denoted as (a) through (v), and/or utilizing the welding jig denoted as (y). The recrystallized weld may have crystals within +/−2 or +/−1 ASTM-112 grain sizes of the grain size of crystals of the original and repair sections of the part. The metal alloy may include titanium and/or nickel, and may form at least part of a rotor blade.

(aa) A repair kit for a damaged metal part may include (1) a repair section of metal, having a repair edge shaped to abut an edge of the damaged metal part, and a flange that overlaps the damaged metal part along the repair edge; and (2) two metal tabs, each metal tab being shaped to fit between the damaged metal part and the repair section, and having a thickness that matches a thickness of the damaged metal part at a respective end of the repair edge. The repair section may have a greater thickness than the damaged metal part at each point along the repair edge, and the flange may be of sufficient thickness to act as a beam stop for at least one of electron beam and laser beam welding.

(bb) A method for repairing a metal part may include utilizing additive manufacturing to build new metal onto the metal part such that at least one dimension of the new metal exceeds a desired final dimension of the metal part; compressively stressing the new metal throughout its volume; heat treating the compressively stressed new metal to recrystallize metal therein; and machining the new metal to the desired final dimension.

The changes described above, and others, may be made in the metal joining methods described herein without departing from the scope hereof. It should thus be noted that the matter contained in the above description or shown in the accompanying drawings should be interpreted as illustrative and not a limiting sense. The following claims are intended to cover generic and specific features described herein, and should be construed to encompass any statements of the scope of the present method and system, which, as a matter of language, might be said to fall there between.

What is claimed is:

1. A method for repairing a metal rotor blade, comprising:
   welding a metal patch to a portion of a metal rotor blade to form a weld nugget joining the metal patch and the portion of the metal rotor blade;
   compressively stressing the weld nugget throughout its volume while maintaining shape of at least a section of the metal patch and the metal rotor blade away from the weld nugget; and
   heat treating the compressively stressed weld nugget to recrystallize metal therein.

2. The method of claim 1, further comprising overlapping the portion of the metal rotor blade with a flange of the metal patch before the welding.

3. The method of claim 2, wherein welding comprises utilizing one of an electron beam and a laser beam, and the flange acts as a beam stop during the welding.

4. The method of claim 1, the welding comprising generating an as-welded structure having at least one dimension that exceeds a desired dimension of a corresponding portion of the metal rotor blade after completing repair of the metal rotor blade.

5. The method of claim 1, the step of welding, the metal patch and the portion of the metal rotor blade being formed of a similar alloy that is one of a titanium-based alloy and a nickel-based alloy.

6. The method of claim 1, the heat treating comprising heating at least the weld nugget to a temperature sufficient to recrystallize metal thereof.

7. The method of claim 1, the heat treating comprising heating at least the weld nugget to a temperature that, in combination with the compressively stressing, is sufficient to recrystallize metal thereof to a parent metallurgical state of the metal patch and the portion of the metal rotor blade.

8. The method of claim 1, further comprising maintaining a substantially constant force pressing together the metal patch and the portion of the metal rotor blade, to keep the metal patch and the portion of the metal rotor blade in intimate contact during the step of welding while allowing for thermal expansion of at least one of the metal patch and the metal rotor blade.

9. The method of claim 1, the compressively stressing comprising indenting the weld nugget with a series of overlapping indentations.

10. The method of claim 9, the compressively stressing further comprising indenting a heat affected zone adjacent to the weld nugget with a series of overlapping indentations.

11. The method of claim 10, the compressively stressing comprising forming each of the overlapping indentations with a primary dimension such that each of the indentations overlaps an adjacent one of the indentations by 10% to 50% of the primary dimension.

12. The method of claim 1, further comprising compressively stressing the weld nugget subsequent to the step of heat treating.

13. The method of claim 12, further comprising compressively stressing a heat affected zone adjacent to the weld nugget subsequent to the step of heat treating.

14. The method of claim 1, in the step of welding the metal patch and the portion of the metal rotor blade being formed of a nickel-based alloy, the method further comprising:
   preheating a preheat zone that includes overlap sections of each of the metal patch and the portion of the metal rotor blade, to a preheat temperature substantially close to one of a gamma prime solvus temperature and a gamma double prime solvus temperature of the nickel-based alloy forming the metal patch and the portion of the metal rotor blade, before the welding; and
   wherein the welding comprises performing the welding while the preheat zone remains substantially at the preheat temperature, and the step of compressively stressing comprises forging the preheat zone.

15. The method of claim 14, the welding comprising performing the welding with equipment utilized for the preheating, and wherein the equipment performs the welding within 10 seconds of discontinuing the preheating.

16. The method of claim 15, the welding comprising performing the welding with equipment utilized for the preheating, and wherein the equipment performs the welding within one second of discontinuing the preheating.

17. The method of claim 14, the welding comprising performing the welding while maintaining the preheat zone at the preheat temperature.

18. The method of claim 14, the preheating comprising heating the preheat zone to a temperature within a range of 300 degrees Fahrenheit below the one of the gamma prime and the gamma double prime solvus temperatures, to the respective gamma prime or gamma double prime solvus temperature.

19. The method of claim 18, the preheating comprising heating the preheat zone to a temperature within a range of 150 degrees Fahrenheit below the one of the gamma prime and the gamma double prime solvus temperature, to the respective gamma prime or gamma double prime solvus temperature.

20. The method of claim 14, further comprising cooling the preheat zone in a controlled manner after the welding.

21. The method of claim 20, the cooling comprising lowering a temperature of the preheat zone at a rate of 500 degrees Fahrenheit, or less, per minute.

22. The method of claim 1, the portion of the metal rotor blade being part of an integrally bladed rotor.

* * * * *